(12) United States Patent
Sulistio et al.

(10) Patent No.: US 9,727,542 B2
(45) Date of Patent: *Aug. 8, 2017

(54) METHOD AND APPARATUS FOR DECLARATIVE UPDATING OF SELF-DESCRIBING, STRUCTURED DOCUMENTS

(71) Applicant: Open Invention Networks, LLC, Durham, NC (US)

(72) Inventors: Muljadi Sulistio, Fremont, CA (US); Yang Wei, Hayward, CA (US); Kelly Lane Schwarzhoff, Napa, CA (US); Yuan Ding, Fremont, CA (US)

(73) Assignee: Open Invention Networks, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,976

(22) Filed: Sep. 14, 2015

(65) Prior Publication Data

US 2016/0004677 A1    Jan. 7, 2016

Related U.S. Application Data

(60) Continuation of application No. 13/460,399, filed on Apr. 30, 2012, now Pat. No. 9,135,226, which is a continuation of application No. 12/290,422, filed on Oct. 1, 2007, now Pat. No. 8,171,396, which is a continuation of application No. 11/371,768, filed on Mar. 9, 2006, now Pat. No. 7,278,096, which is a division of application No. 10/026,364, filed on Dec. 18, 2001, now Pat. No. 7,036,072.

(51) Int. Cl.
*G06K 3/00* (2006.01)
*G06F 17/22* (2006.01)
*G06F 17/24* (2006.01)

(52) U.S. Cl.
CPC ........ *G06F 17/2247* (2013.01); *G06F 17/227* (2013.01); *G06F 17/24* (2013.01)

(58) Field of Classification Search
CPC ..... G06F 17/2247; G06F 17/227; G06F 17/24
See application file for complete search history.

(56) References Cited

U.S. PATENT DOCUMENTS

| | | |
|---|---|---|
| 4,402,569 A | 9/1983 | Bow et al. |
| 4,418,689 A | 12/1983 | Kanazawa et al. |
| 4,944,738 A | 7/1990 | Rodriguez |
| 5,269,779 A | 12/1993 | Sogawa et al. |

(Continued)

FOREIGN PATENT DOCUMENTS

| | | |
|---|---|---|
| EP | 0704795 A1 | 4/1996 |
| WO | 9834179 A1 | 8/1998 |

OTHER PUBLICATIONS

Kay, M., "Things XSLT Can't Do", retrieved from: >www.dpawson.co.uk/xsl/sect2/nono.html#d1874e495> (accessed Aug. 9, 2012), 19 pages.

(Continued)

*Primary Examiner* — Kyle Stork
(74) *Attorney, Agent, or Firm* — Haynes Beffel & Wolfeld LLP; Ernest J. Beffel, Jr.

(57) ABSTRACT

The present invention includes a method and device for updating a self-describing, structured document. A further aspect of the present invention is enabling client-based modification of the document. Additional aspects of the present invention are described in the claims, specification and drawings.

17 Claims, 25 Drawing Sheets

(56) References Cited

U.S. PATENT DOCUMENTS

| | | | |
|---|---|---|---|
| 5,300,061 A | 4/1994 | Easley et al. |
| 5,557,798 A | 9/1996 | Skeen et al. |
| 5,607,420 A | 3/1997 | Schuman |
| 5,662,646 A | 9/1997 | Fumich |
| 5,684,985 A | 11/1997 | Ahmadi |
| 5,733,279 A | 3/1998 | Konwitz et al. |
| 5,734,916 A | 3/1998 | Greenfield et al. |
| 5,742,845 A | 4/1998 | Wagner |
| 5,772,658 A | 6/1998 | Konwitz et al. |
| 5,778,400 A | 7/1998 | Tateno et al. |
| 5,790,677 A | 8/1998 | Fox et al. |
| 5,812,999 A | 9/1998 | Tateno |
| 5,923,833 A | 7/1999 | Freund et al. |
| 5,963,641 A | 10/1999 | Crandall et al. |
| 5,983,200 A | 11/1999 | Slotznick |
| 6,012,098 A | 1/2000 | Bayeh et al. |
| 6,026,432 A | 2/2000 | Potts, Jr. |
| 6,049,785 A | 4/2000 | Gifford |
| 6,055,513 A | 4/2000 | Katz et al. |
| 6,125,391 A | 9/2000 | Meltzer et al. |
| 6,138,129 A | 10/2000 | Combs |
| 6,216,158 B1 | 4/2001 | Luo et al. |
| 6,226,675 B1 | 5/2001 | Meltzer et al. |
| 6,230,201 B1 | 5/2001 | Guck et al. |
| 6,240,407 B1 | 5/2001 | Chang et al. |
| 6,243,501 B1 | 6/2001 | Jamali |
| 6,311,194 B1 | 10/2001 | Sheth et al. |
| 6,330,573 B1 | 12/2001 | Salisbury et al. |
| 6,330,574 B1 | 12/2001 | Murashita |
| 6,338,067 B1 | 1/2002 | Baker et al. |
| 6,360,215 B1 | 3/2002 | Judd et al. |
| 6,421,656 B1 | 7/2002 | Cheng et al. |
| 6,480,860 B1 | 11/2002 | Monday |
| 6,493,702 B1 | 12/2002 | Adar et al. |
| 6,507,857 B1 | 1/2003 | Yalcinalp |
| 6,538,673 B1 | 3/2003 | Maslov |
| 6,553,364 B1 | 4/2003 | Wu |
| 6,582,474 B2 | 6/2003 | LaMarca et al. |
| 6,589,291 B1 | 7/2003 | Boag et al. |
| 6,591,260 B1 | 7/2003 | Schwarzhoff et al. |
| 6,635,089 B1 | 10/2003 | Burkett et al. |
| 6,650,433 B1 | 11/2003 | Keane et al. |
| 6,684,204 B1 | 1/2004 | Lal |
| 6,699,239 B1 | 3/2004 | Stiller et al. |
| 6,715,129 B1 | 3/2004 | Hind et al. |
| 6,721,727 B2 | 4/2004 | Chau et al. |
| 6,874,141 B1 | 3/2005 | Swamy et al. |
| 6,917,937 B1 | 7/2005 | Rubendall |
| 7,010,533 B1 | 3/2006 | Kutsumi et al. |
| 7,036,072 B1 | 4/2006 | Sulistio et al. |
| 7,058,886 B1 | 6/2006 | Sulistio et al. |
| 7,072,984 B1 | 7/2006 | Polonsky et al. |
| 7,089,583 B2 | 8/2006 | Mehra et al. |
| 7,237,191 B1 | 6/2007 | Sulistio et al. |
| 7,266,766 B1 | 9/2007 | Claussen et al. |
| 7,266,814 B2 | 9/2007 | Bosworth et al. |
| 7,278,096 B2 | 10/2007 | Sulistio et al. |
| 7,305,614 B2 | 12/2007 | Chen et al. |
| 7,321,870 B1 | 1/2008 | Comiskey et al. |
| 7,415,669 B1 | 8/2008 | Davidson et al. |
| 7,707,492 B2 | 4/2010 | Zaharkin |
| 2001/0049650 A1 | 12/2001 | Moshal et al. |
| 2001/0056429 A1 | 12/2001 | Moore et al. |
| 2002/0002586 A1 | 1/2002 | Rafal et al. |
| 2002/0049788 A1 | 4/2002 | Lipkin et al. |
| 2002/0054090 A1 | 5/2002 | Silva et al. |
| 2002/0069083 A1 | 6/2002 | Harter et al. |
| 2002/0083093 A1 | 6/2002 | Goodisman et al. |
| 2002/0087592 A1 | 7/2002 | Ghani |
| 2002/0099735 A1 | 7/2002 | Schroeder et al. |
| 2002/0107881 A1 | 8/2002 | Patel |
| 2002/0116421 A1 | 8/2002 | Fox et al. |
| 2002/0135621 A1 | 9/2002 | Angiulo et al. |
| 2002/0143818 A1 | 10/2002 | Roberts et al. |
| 2002/0143823 A1 | 10/2002 | Stevens |
| 2002/0147847 A1 | 10/2002 | Brewster et al. |
| 2002/0156803 A1 | 10/2002 | Maslov et al. |
| 2003/0041076 A1 | 2/2003 | Lucovsky et al. |
| 2003/0065874 A1 | 4/2003 | Marron et al. |
| 2003/0088824 A1 | 5/2003 | Ayan |
| 2003/0125929 A1 | 7/2003 | Bergstraesser et al. |
| 2003/0140034 A1 | 7/2003 | Probst et al. |
| 2003/0208473 A1 | 11/2003 | Lennon |
| 2004/0162773 A1 | 8/2004 | Del Rey et al. |
| 2004/0205448 A1 | 10/2004 | Grefenstette et al. |
| 2004/0205456 A1 | 10/2004 | Hammock et al. |
| 2004/0205459 A1 | 10/2004 | Green |
| 2004/0205615 A1 | 10/2004 | Birder |
| 2004/0205644 A1 | 10/2004 | Shaughnessy et al. |
| 2006/0156224 A1 | 7/2006 | Sulistio et al. |
| 2008/0301544 A1 | 12/2008 | Davidson et al. |
| 2008/0306883 A1 | 12/2008 | Baffier et al. |
| 2009/0043798 A1 | 2/2009 | Tan et al. |
| 2010/0333153 A1 | 12/2010 | Sahota et al. |

OTHER PUBLICATIONS

Clark, J., "XSL Transformations (XSLT)," Version 1.0 W3C Recommendation Nov. 16, 1999, pp. 1-102.

"Deja Power Search Graphical User interface", downloaded from: www.exit109.com/.about.jeremy/news/deja.html, . COPYRGT. Feb. 12, 2000, pp. 1-20.

Seilonen, et al., "Experience from the Development of an XML/XSLT-based Integration Server for a Virtual Enterprise Type Co-Operation," published by 7th International Conference on Concurrent Enterprising Jun. 27-29, 2001, pp. 1-8.

Nair, D. R., "Visual Design Versus Development: A Case Study Presenting How XML and XSLT can separate Presentation From Data," published by University of Florida, 2001, pp. 1-97.

Bergeron et al. "Managing EDI for corporate advantage: A longitudinal study," Information & Management, 31, 1997, pp. 319-333, Elsevier.

Bonometti, Robert et al., "The Walls Coming Down: Interoperability Opens the Electronic City," Te Future of the Electronic Marketplace, The MIT Press, Cambridge, Massachusetts, 1998, pp. 265-301.

Bort, Richard, et al. "EDI on the Internet," Handbook of EDI, 1997, pp. B7-1-B7-19, Warren, Gorham & Lamont, USA.

Bray, T., et al. (ed). "Extensible Markup Language (XML) 1.0," W3C Recommendation, Feb. 10, 1998, Retrieved from the internet: <http://www.w3.org/TR/1998/REC-xml-19980210>, 37 pages.

Chappell, D., "Simple Object Access Protocol (SOAP)," Microsoft Windows: Simple Object Access Protocol Technical Article, Sep. 10, 1999, Microsoft Corporation, 6 pages.

Hung, P Emerald, et al. "DCOM and CORBA Side by Side, Step by Step, and Layer by Layer," Can be found at: http://www.cs.wustl.edu/~schmidt/submit/Paper.html.

Finn, Tim, et al. "KQML as an Agent Communication Language," DRAFT, Baltimore MD, USA, Sep. 1995, 22 pages.

Fuchs, M., "Domain Specific Languages for ad hoc Distributed Applications," USENIX Association, Conference on Domain-Specific Languages, Oct. 15-17, 1997, pp. 27-35.

Gallego, Isabel, et al. "Distributed Models for Brokerage on Electronic Commerce," TREC '98, LINCS 1402, 1998, pp. 129-140, Springer-Verlag Berlin Heidelberg.

Garguilo, John, et al. "Guidelines for the Evaluation of Electronic Data Interchange Products," DRAFT—Technical Report CAML/CLS, Dec. 6, 1995, Gaithersburg, MD, USA.

Ghosh, Shikhar, "Making Business Sense of the Internet," Harvard Business Review, Mar.-Apr. 1998, pp. 126-135.

Howes, T., et al. "A Scalable, Deployable, Directory Service Framework for the Internet," Jul. 11, 1995, Retrieved from the Internet: <http://infor.isoc.org/HMP/PAPER/173/html/paper.html>, 12 pages.

Khoo, L., et al., "The Potential of Intelligent Software Agents in the World Wide Web in Automating Part Procurement," International Journal of Purchasing and Materials Management, Jan. 1998, pp. 46-52.

(56) References Cited

OTHER PUBLICATIONS

Kimbrough, S. O., et al. "On Automated Message Processing in Electronic Commerce and Work Support Systems: Speech Act Theory and Expressive Felicity," ACM Transactions on Information Systems, vol. 15, No. 4, Oct. 1997, pp. 321-367, New York, NY, USA.

Riggins, Frederick, et al. "Toward a Unified View of Electronic Commerce," Communications of the ACM, Oct. 1998/vol. 41, No. 10, pp. 88-95.

Tenenbaum, J., et al.,"Eco System: An Internet Commerce Architecture," IEEE Computer Journal, May 1997, pp. 48-55.

"The Internet—Untangling the Web," The Economist, Apr. 23, 1998, 3 pages.

Brickley, D., et al., "Resource Description Framework (RDF) Schema Specification", W3C Proposed Recommendation Mar. 3, 1999, W3C XP-002203858, Retrieved from the Internet: <http://w3.org/TR/1999/PR-rdf-schema-19990303>, pp. 1-29.

Beech, D., et al. (ed). "XML Schema Part 1: Structures", W3C Working Draft May 6, 1999, W3C XP-002203859, Retrieved from the Internet: <http://www.w3.org/1999/05/06-xmlschema-1>, pp. 1-53.

Biron, P. V. et al. (ed.) "XML Schema Part 2: Datatypes" World Wide Web Consortium Working Draft May 6, 1999, W3C XP-00203860, Retrieved from the internet: <http://www.w3.org/1999/05/06-xmlschema-2>, pp. 1-28.

Brown, K., "BizTalk: Fluent in E-Business", XP-002203861, Copyright Dec. 1999, pp. 1-6.

Yeong, W., et al. "Lightweight Directory Access Protocol", ISODE Consortium, Mar. 1995, 20 pages.

Moats, R., "URN Syntax," AT&T, May 1997, pp. 1-7.

Niarayanaswamy, K. et al. "An Incremental Mechanism for Schema Evolution in Engineering Domains", IEEE 1988, pp. 294-300.

Klarlund, N., et al. "Document Structure Description 1.0", AT&T and BRICS 1999, XP-002203865, pp. 1-34.

Davidson, A., et al. "Schema for Object-Oriented XML 2.0" W3C Note Jul. 30, 1999, W3C XP-002203857, Retrieved from: <http://www.w3.org/1999/07/NOTE-SOX-19990730>, pp. 1-22.

Liechti, O., et al. "Structured graph format: XML metadata for describing Web site structure," Computer Networks and ISDN Systems 30 (1998), 11 pages.

Kristensen, A., "Template resolution in XML/HTML" Computer Networks ISDN Systems 30 (1998) pp. 239-249.

Dudeck, J., "Aspects of Implementing and Harmonizing Healthcare Communication Standards," Institute of Medical Informatics 48 (1998), pp. 163-171.

"Document Object Model (DOM) Tutorial," Oct. 30, 2000, Retrieved from the internet: <http://web.archive.org/web/20010212070738/http://www.thescarms.com/XML/DOMTutorial.asp>, pp. 1-10.

"XML and EDI: Peaceful Co-Esistence," 2001, Xedi.org White Paper, pp. 1-15.

Van Der Vlist, E., "Comparing XML Schema Languages," Dec. 12, 2001, Retrieved from the internet: <http://www.xml.com/pub/a/2001/12/12/schemacompare.html>, pp. 1-7.

Ogbuji, C., "Validating XML with Schematron," Nov. 22, 2000, Retrieved from the internet: http://www.xml.com/pub/a/2000/11/11/22/schematron.html>, pp. 1-8.

Harold, E.R., et al. "XML in a Nutshell," Jan. 2001, Retrieved from the internet: http://www.oreilly.com/catalog/xmlnut/chapter/ch09.html>, pp. 1-20.

Rodriguez, Juan R., et al, "IBM Websphere Transcoding Publisher Version 1.1: Extending Web Applications to the Pervasive World", IBM Redbook,2000, 336 pages.

Carlson, D., "Modeling XML Vocabularies with UML: Part I," Aug. 22, 2001, Retrieved from the internet: <http://www.xml.com/pub/a/2001/08/22/uml.html>, pp. 1-5.

Harold, E.R., "XML: Extensible Markup Language," IDG Books Worldwide, Inc., Foster City, CA, Copyright 1998, pp. 14-15, 37-42 and 259-271 (23 pages total).

Eddy, S. T., et al., "Teach Yourself XML," IDG Books Worldwide, Inc., Foster City, CA, .COPYRGT. 1999, pp. 303-313 and 433-443.

Clark, James, "XML Path Language (Xpath): Version 1.0", W3C Recommendation Nov. 16, 1999, downloaded from: www.w3.org/TR/xpath, 33 pages.

Holman, G Ken, "What is XSLT", downloaded from: http://www.xml.com/pub/a/2000/08/holman/index.html, Dec. 7, 2000, pp. 1-337.

"The American Heritage College Dictionary," 4th Edition, Houghton Mifflin Co., Boston, Copyright 2002, p. 705.

Freire, J., et al., "WebViews: Accessing Personalized Web Content and Services", WWW 10, Hong Kong, May 1-5, 2001, pp. 576-586.

Altinel, M., et al., "Efficient Filtering of XML Documents for Seletive Dissemination of Information", Proceedings of the VLDB Conference, Cairo, Egypt, Sep. 10-14, 2000, pp. 53-64.

Ambroziak, J., "Managing Tokenizers in XML Search", XML Europe 2000, Paris, France, Jun. 12-16, 2000, pp. 1-7.

"GCA Conference Flyers", XML Europe 2000, Paris, France, Jun. 12-16, 2000, pp. 1-2.

"XML Query Engine Provides Initial XQuery Support", XML Coverpages, downloaded from: xml.coverpages.org/ni2001-04-27-c.html, Apr. 27, 2001, 1 page.

"Deja Power Search Graphical User interface", Sep. 23, 1999, Retrieved from: <web.archive.org/web/19991008231252/http://www.exit109.com/.about.jeremy/n-ews/deja.html>, 20 pages.

Egnor, D., et al., "Structured Information Retrieval Using XML", Proceedings of the ACM SIGIR 2000 Workshop on XML and Information Retrieval, Athens, Greece, Jul. 2000, pp. 1-10, Retrieved from the internet: <web.archive.org/web/20010723114842/http://www.haifa.il.ibm.com/sigir00-xm-l/final-papers/Egnor/>.

Ide, N., "The XML Framework and Its Implications for Corpus Access and Use," published 2000, pp. 1-5.

Kay, M., "XLST 2.0 and XPath 2.0, Programmer's Reference, 4th edtiion", Wiley Publishing, Inc., 2008, 1371 pages.

| Type_ID | Type | Name_Space | TS_Supported | Application_Created |
|---|---|---|---|---|
| 1 | RequestFor Quotati | urn:x-commerceone:document:com:commerceone:XCBL35:XCBL35.sox$1.0 | 0 | 1 |
| 2 | RequestFor Quotati | urn:x-commerceone:document:com:commerceone:XCBL30:XCBL30.sox$1.0 | 0 | 1 |
| 3 | Quote | urn:x-commerceone:document:com:commerceone:XCBL35:XCBL35.sox$1.0 | 0 | <NULL> |
| 4 | Quote | urn:x-commerceone:document:com:commerceone:XCBL30:XCBL30.sox$1.0 | 0 | 1 |
| 5 | Order | urn:x-commerceone:document:com:commerceone:XCBL35:XCBL35.sox$1.0 | 0 | <NULL> |
| 6 | Order | urn:x-commerceone:document:com:commerceone:XCBL30:XCBL30.sox$1.0 | 0 | <NULL> |
| 7 | AdvanceShipment| | urn:x-commerceone:document:com:commerceone:XCBL35:XCBL35.sox$1.0 | 0 | <NULL> |
| 8 | AdvanceShipment| | urn:x-commerceone:document:com:commerceone:XCBL30:XCBL30.sox$1.0 | 0 | 1 |
| 9 | AdvanceShipment| | urn:x-commerceone:document:com:commerceone:CBL01:CBL01.sox$1.0 | 0 | <NULL> |
| 10 | Invoice | urn:x-commerceone:document:com:commerceone:XCBL35:XCBL35.sox$1.0 | 0 | 1 |
| 11 | Invoice | urn:x-commerceone:document:com:commerceone:XCBL30:XCBL30.sox$1.0 | 0 | <NULL> |
| 12 | Invoice | urn:x-commerceone:document:com:commerceone:CBL01:CBL01.sox$1.0 | 0 | 1 |
| 13 | PurchaseOrder | urn:x-commerceone:document:com:commerceone:CBL01:CBL01.sox$1.0 | 0 | 1 |
| 14 | PurchaseOrder | urn:x-commerceone:document:com:commerceone:CBL:CBL.sox$1.0 | 0 | 1 |

```

# The file is for the displaying the XPath information in search page.
# Default is empty. You can put the XPath and information like:
# Order/OrderHeader/OrderNumber/BuyerOrderNumber = Purchase Order Number

```
    2501

```
/Order/OrderHeader/OrderNumber/BuyerOrderNumber = PO#
/Order/OrderHeader/Purpose/PurposeCoded/ = PO Purpose
/Order/OrderHeader/OrderParty/BuyerParty/Party/PartyID/Identifier/Ident = Buyer ID
/Order/OrderHeader/OrderParty/SellerParty/Party/PartyID/Identifier/Agency/AgencyCoded
= Seller Agency Coded
/PriceCheckRequest/PriceCheckRequestDetail/ListOfPriceCheckRequestItemDetail/PriceChe
ckRequestItemDetail/PriceCheckRequestBaseItemDetail/LineItemNum/BuyerLineItemNum =
Buyer Line Item Number
/Quote/QuoteHeader/QuoteID/Reference/RefNum = Reply Quote #
/Quote/ListOfQuoteDetails/QuoteDetails[*]/QuoteItemType/QuoteType/QuoteTypeCoded =
Type
/RequestForQuotation/RequestQuoteHeader/RequestQuoteID/Reference/RefNum = PO#
/RequestForQuotation/RequestQuoteHeader/RequestQuoteParty/OrderParty/BuyerParty/Party
/NameAddress/Name1 = Buyer Name
```

```

# ******** Multiple occurrence ********

```
    2502

```
/Quote/ListOfQuoteDetails/QuoteDetails[*]/QuoteItemDetail/TotalQuantity/Quantity/Quan
tityValue/@ConditionsCoded = Quantity Coded (attribute)
/Quote/ListOfQuoteDetails/QuoteDetails[*]/QuoteItemDetail/TotalQuantity/Quantity/Quan
tityValue/@SignificanceCoded = Signific (attribute)
/Quote/ListOfQuoteDetails/QuoteDetails[*]/QuoteItemListOfAttachment/ListOfAttachment/
Attachment[*]/FileName = Attach File
/RequestForQuotation/ListOfRequestQuoteDetails/RequestQuoteDetails[*]/RequestQuoteIte
mDetail/BaseItemDetail/ItemIdentifiers/PartNumbers/BuyerPartNumber/PartNum/PartID =
Part Number
/RequestForQuotation/ListOfRequestQuoteDetails/RequestQuoteDetails[*]/RequestQuoteIte
mDetail/BaseItemDetail/LineItemNum/BuyerLineItemNum = Line Item#
/RequestForQuotation/ListOfRequestQuoteDetails/RequestQuoteDetails[*]/RequestQuoteIte
mDetail/BaseItemDetail/TotalQuantity/Quantity/QuantityValue/@SignificanceCoded = QTY
Code (attr.)
/AdvanceShipmentNotice/ASNHeader/ASNParty/OrderParty/SellerParty/Party/OtherContacts/
ListOfContact/Contact[*]/ContactName = Contact Name
```

```

# ******** Different name space ********

```
    2503

```
/ChangeOrder/ChangeOrderHeader/CBLPrefix\:OrderReference/CBLPrefix\:AccountCode/CBLPr
efix\:Reference/CBLPrefix\:RefNum = Tester_R#
/ChangeOrder/ChangeOrderHeader/CBLPrefix\:POIssueDate = PO Date
/ChangeOrder/ChangeOrderHeader/CBLPrefix\:RequestedDeliveryDate = Delivery Date
/ChangeOrder/ChangeOrderHeader/CBLPrefix\:ShipByDate = Ship Date
/ChangeOrder/ChangeOrderHeader/CBLPrefix\:OrderReference/CBLPrefix\:AccountCode/CBLPr
efix\:Reference/CBLPrefix\:RefNum = Acc R#
/ChangeOrder/ChangeOrderHeader/CBLPrefix\:OrderParty/CBLPrefix\:BuyerParty/CBLPrefix\
:Party/@PartyID = Party ID (attribute)
/ChangeOrder/ChangeOrderHeader/CBLPrefix\:OrderParty/CBLPrefix\:BuyerParty/CBLPrefix\
:Party/@AgencyID = Agency ID (attribute)
```

FIG. 25

| RR_Searchable | Document_Seq_Nu | RR_Field_Definition | Value |
|---|---|---|---|
| 218 | 373 | 34 | Contemporary Resume.dot |
| 219 | 373 | 36 | Accept |
| 220 | 373 | 36 | Decline |
| 221 | 375 | 26 | Actual |
| 222 | 375 | 34 | commerceone.gif |
| 223 | 375 | 34 | test.ppt |
| 224 | 375 | 36 | Accept |
| 225 | 375 | 36 | Decline |
| 226 | 378 | 17 | 20010829T11:40:04 |
| 227 | 378 | 1 | cfsiqwx |
| 228 | 378 | 3 | Other |
| 229 | 378 | 14 | 731553717078757.76 |
| 230 | 378 | 13 | 102124846200985.858 |
| 231 | 378 | 6 | -1025433866 |
| 232 | 378 | 10 | rjsupio |
| 233 | 378 | 11 | 354510583455328.450 |
| 234 | 378 | 12 | 54445096814106.333 |
| 235 | 378 | 38 | vymtrcev |
| 236 | 378 | 38 | svrjgevqdl |
| 237 | 378 | 38 | rfemopkh |
| 238 | 378 | 38 | lirjght |
| 239 | 387 | 41 | T-77-0-0-56 |
| 240 | 387 | 42 | TrueValue |
| 241 | 387 | 40 | PC-009 |
| 242 | 387 | 44 | AAA Company |
| 243 | 388 | 41 | T-77-0-0-56 |
| 244 | 388 | 42 | TrueValue |
| 245 | 388 | 40 | PC-009 |
| 246 | 388 | 44 | AAA Company |
| 247 | 389 | 42 | TrueValue |

FIG. 26A

| | | | |
|---|---|---|---|
| ☐ 248 | 389 | 40 | PC-009 |
| ☐ 249 | 389 | 44 | AAA Company |
| ☐ 250 | 391 | 29 | Actual |
| ☐ 251 | 391 | 27 | TrueValue |
| ☐ 252 | 391 | 32 | PlanningSchedule_3_30.xml |
| ☐ 253 | 391 | 32 | AvailabilityToPromiseResponse_3_30.xml |
| ☐ 254 | 391 | 32 | Invoice_3_30.xml |
| ☐ 255 | 391 | 20 | Accept |
| ☐ 256 | 391 | 20 | Decline |
| ☐ 257 | 391 | 19 | test xpath |
| ☐ 258 | 392 | 26 | Actual |
| ☐ 259 | 392 | 34 | PlanningSchedule_3_30.xml |
| ☐ 260 | 392 | 34 | AvailabilityToPromiseResponse_3_30.xml |
| ☐ 261 | 392 | 34 | Invoice_3_30.xml |
| ☐ 262 | 392 | 36 | Accept |
| 2601 | 2602 | 2603 | 2604 |

FIG. 26B

METHOD AND APPARATUS FOR DECLARATIVE UPDATING OF SELF-DESCRIBING, STRUCTURED DOCUMENTS

PRIORITY INFORMATION

This application is a continuation of U.S. application Ser. No. 13/460,399, filed on Apr. 30, 2012, issuing as U.S. Pat. No. 9,135,226, entitled METHOD AND APPARATUS FOR DECLARATIVE UPDATING OF SELF-DESCRIBING, STRUCTURED DOCUMENTS (OIN 1007-4), which is a continuation of U.S. U.S. application Ser. No. 12/290,422, filed Oct. 1, 2007, issuing as U.S. Pat. No. 8,171,396, entitled METHOD AND APPARATUS FOR DECLARATIVE UPDATING OF SELF-DESCRIBING, STRUCTURED DOCUMENTS (OIN 1007-3), which is a continuation of U.S. application Ser. No. 11/371,768, now U.S. Pat. No. 7,278,096, filed Mar. 9, 2006, entitled METHOD AND APPARATUS FOR DECLARATIVE UPDATING OF SELF-DESCRIBING, STRUCTURED DOCUMENTS (OIN 1007-2). U.S. Pat. No. 7,278,096 is a divisional of U.S. application Ser. No. 10/026,364, filed Dec. 18, 2001, now U.S. Pat. No. 7,036,072, entitled METHOD AND APPARATUS FOR DECLARATIVE UPDATING OF SELF-DESCRIBING, STRUCTURED DOCUMENTS (OIN 1007-1), by the same inventors.

CROSS REFERENCE TO RELATED APPLICATIONS

The present application is related to the commonly assigned, U.S. patent application Ser. No. 09/794,302, filed on Feb. 27, 2001, now U.S. Pat. No. 7,415,669, entitled A METHOD AND APPARATUS FOR VIEWING ELECTRONIC COMMERCE-RELATED DOCUMENTS (OIN 1002-1), by inventors Andrew Everett Davidson, Kelly Lane Schwarzhoff, Gunawan Herri, Changyi Zhu, Ari Krish, Muljadi and Sun Keun Lee, which is hereby incorporated by reference as if fully set forth.

This application is further related to the commonly co-assigned U.S. patent application Ser. No. 10/026,663, xCBL MAILBOX METHODS AND DEVICES (OIN 1010-1) filed on Dec. 18, 2001, by inventors Muljadi Sulistio, Yang Wei, Kelly Lane Schwarzhoff, Yuan Ding, Sun Lee and Andy Yang, and the following U.S. patents, also based on applications filed on Dec. 18, 2001: U.S. Pat. No. 7,058,886, METHOD AND APPARATUS FOR DECLARATIVE ERROR HANDLING AND PRESENTATION (OIN 1008-1) issued Jun. 6, 2006; and U.S. Pat. No. 7,237,191, METHOD AND APPARATUS FOR GENERIC SEARCH INTERFACE ACROSS DOCUMENT TYPES (OIN 1009-1) issued Jun. 6, 2007; by inventors Muljadi Sulistio, Yang Wei, Kelly Lane Schwarzhoff, Yuan Ding, Sun Lee and Andy Yang; which are hereby incorporated by reference as if fully set forth.

COPYRIGHT NOTICE

A portion of the disclosure of this patent document contains material, which is subject to copyright protection. The copyright owner has no objection to the facsimile reproduction by anyone of the patent document or the patent disclosure is it appears in the Patent and Trademark Office patent file or records, but otherwise reserves all copyright rights whatsoever.

BACKGROUND OF THE INVENTION

Electronic commerce between businesses has gained substantial momentum. Electronic marketplaces and XML or similar documents have begun to replace traditional EDI formats for commerce-related documents. Still, many businesses, particularly small and medium-sized businesses, have not adopted automated EDI or XML document processing. Whatever their size, many businesses face the prospect of an expedited implementation of EDI or XML document processing. It remains easier for large trading partners to generate XML or similar documents than it is for small to medium-sized businesses to adopt the technology needed to process them. In addition, a full scale conversion to EDI or XML transaction processing may involve far more documents than a business can practically convert in a workable time frame or on a reasonable budget.

One problem with the implementation of EDI or XML transaction processing is the complexity and cost of procedural programming to process business documents. Procedural programming, otherwise known as hard coding, requires much effort to describe document transformations and manipulations in procedural terms, using programming languages such as Java and C++. This effort translates into time for implementation and cost of implementation.

In some domains or problem spaces, declarative programming has been introduced. It is generally hoped that so-called declarative programming can make program customization accessible even to non-programmers. At the same time, it has been recognized that declarative programming is best when applied to a limited domain. Accordingly, declarative approaches are narrow and tailored, not generally applied.

Therefore, in the domain of exchanging self-defining, structured documents, desirable to develop declarative methods and components for simplifying the handling of documents. Declarative methods and components can improve interactions with users, particularly in the areas of producing documents, presenting error messages and searching for documents.

SUMMARY OF THE INVENTION

The present invention includes a method and device for updating a self-describing, structured document. A further aspect of the present invention is enabling client-based modification of the document. Additional aspects of the present invention are described in the claims, specification and drawings.

BRIEF DESCRIPTION OF FIGURES

FIGS. 23-26A-B illustrate data tables used to prepare documents for searching.

DETAILED DESCRIPTION

The following detailed description is made with reference to the figures. Preferred and alternative embodiments are described to illustrate the present invention, not to limit its scope, which is defined by the claims. Those of ordinary skill in the art will recognize a variety' of equivalent variations on the description that follows.

Figure 1:
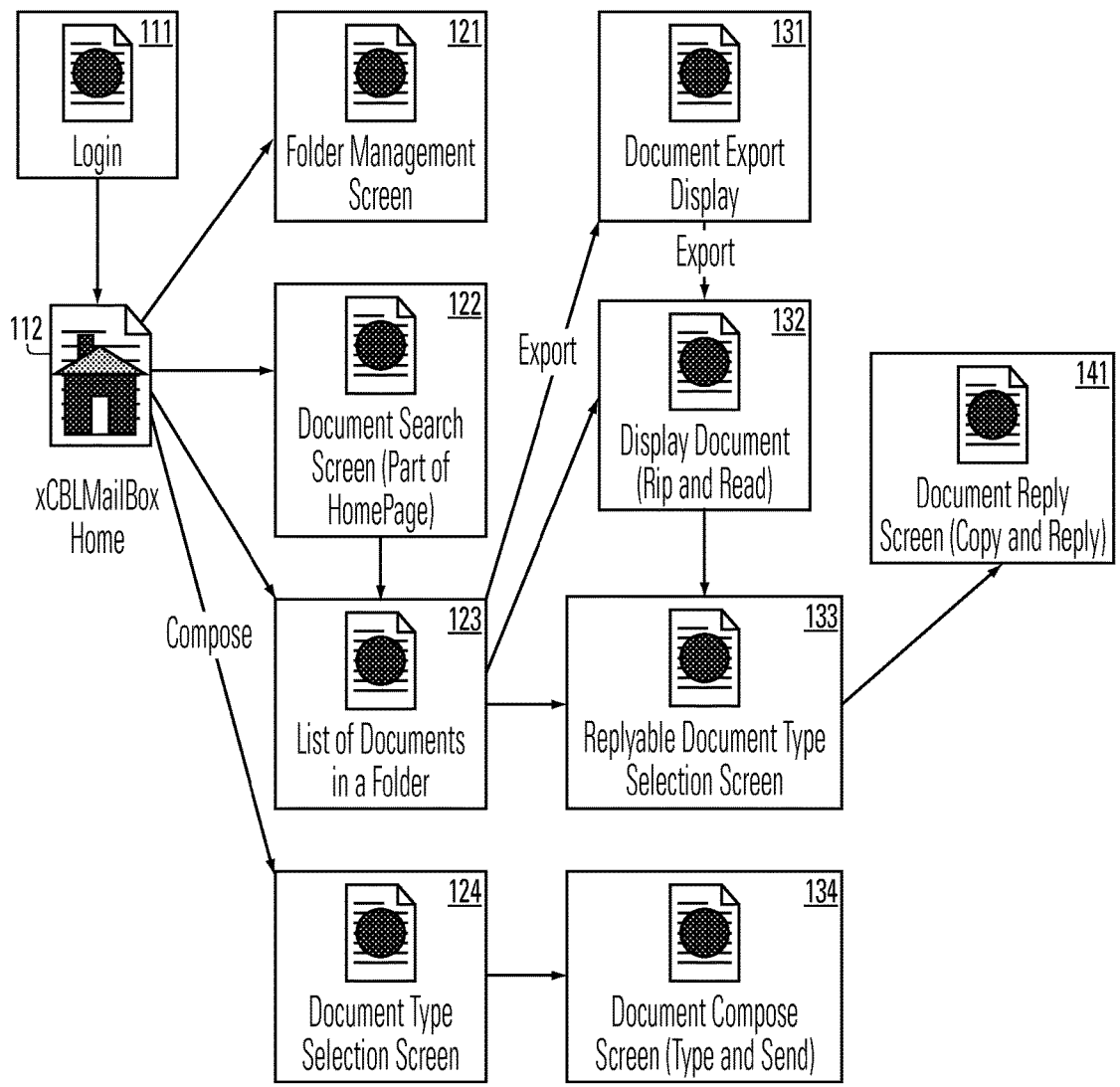
FIG. 1 is an overview of the user interface for an xCBL mailbox.
Figure 2:
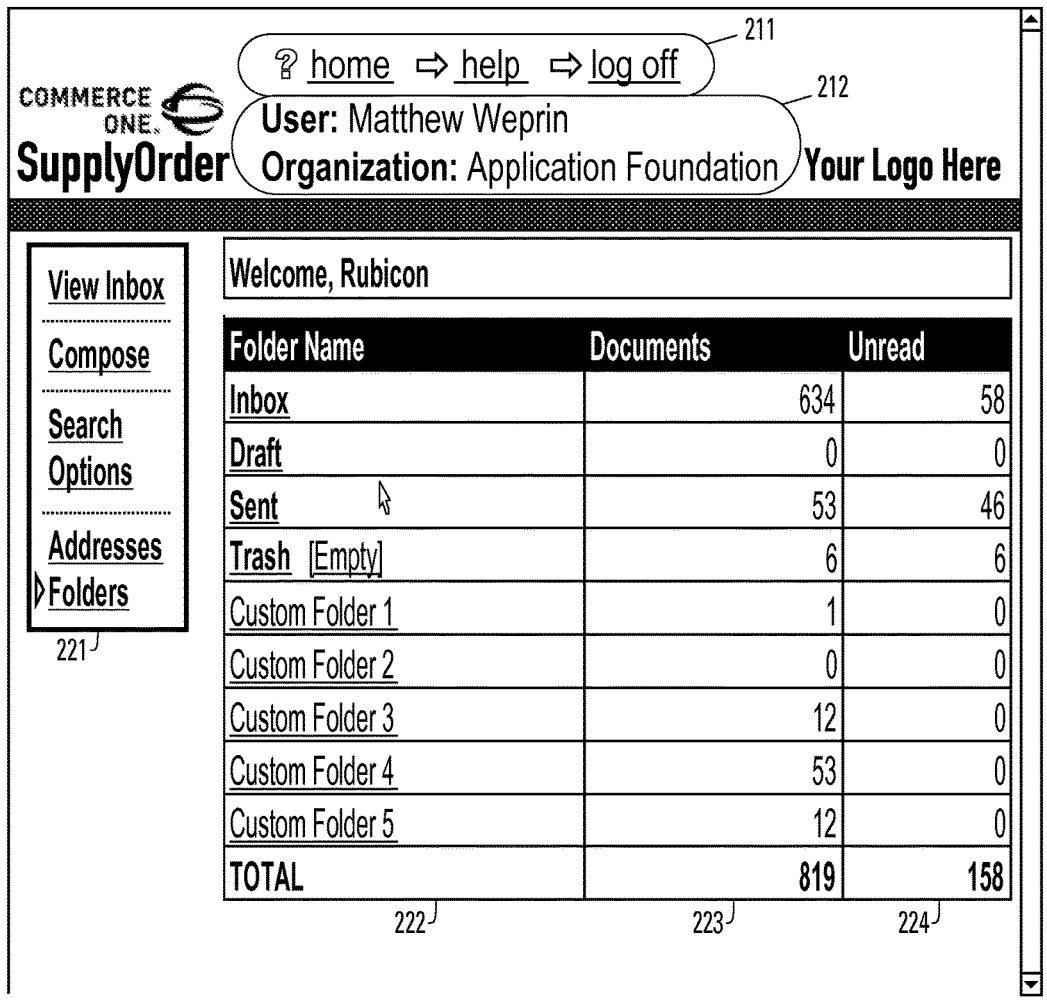
FIG. 2 is a sample screen display of a folder list, as part of a user interface.
Figure 3:
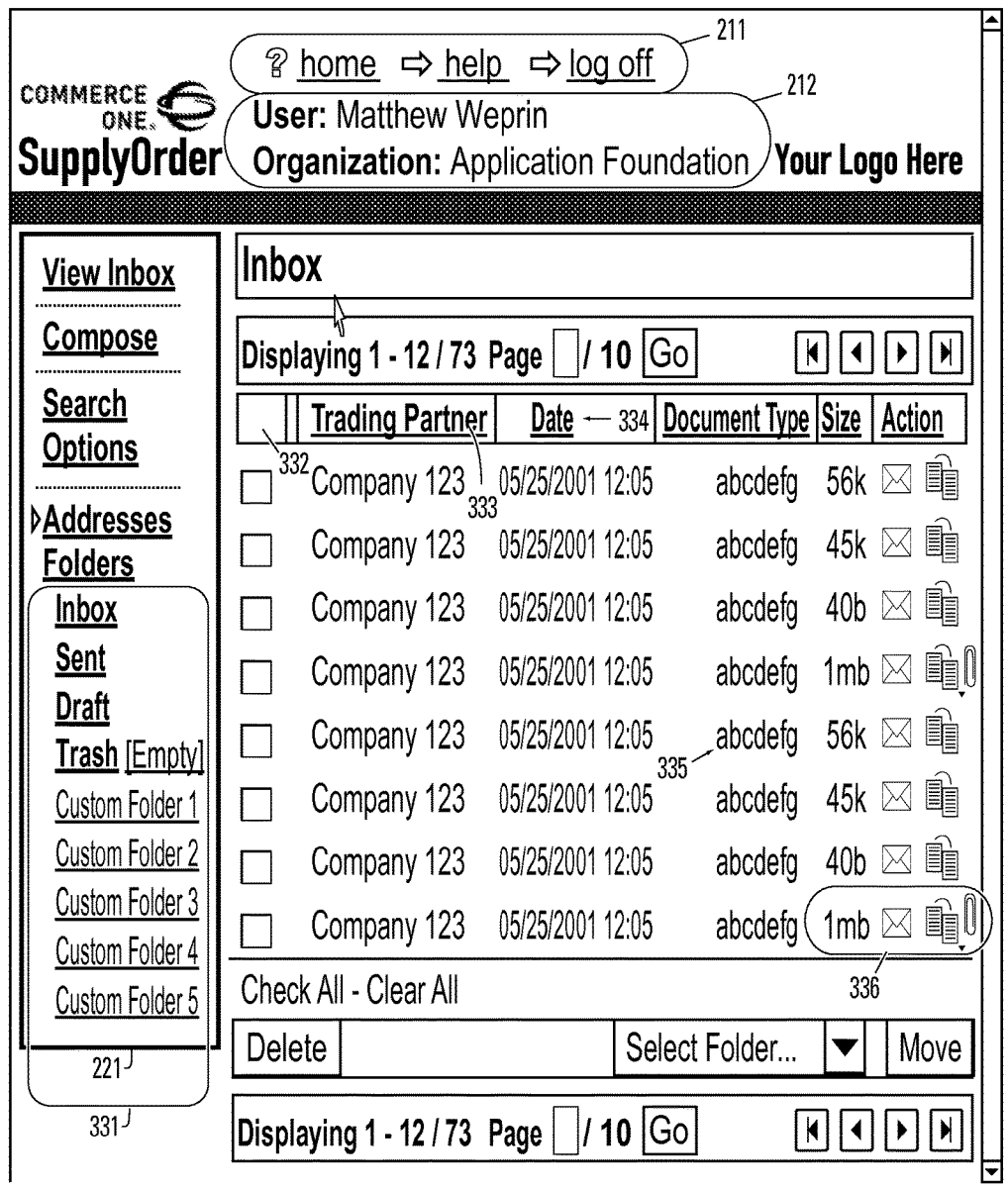
FIG. 3 is a sample screen display for a list of documents within a folder, as part of a user interface.
Figure 5:
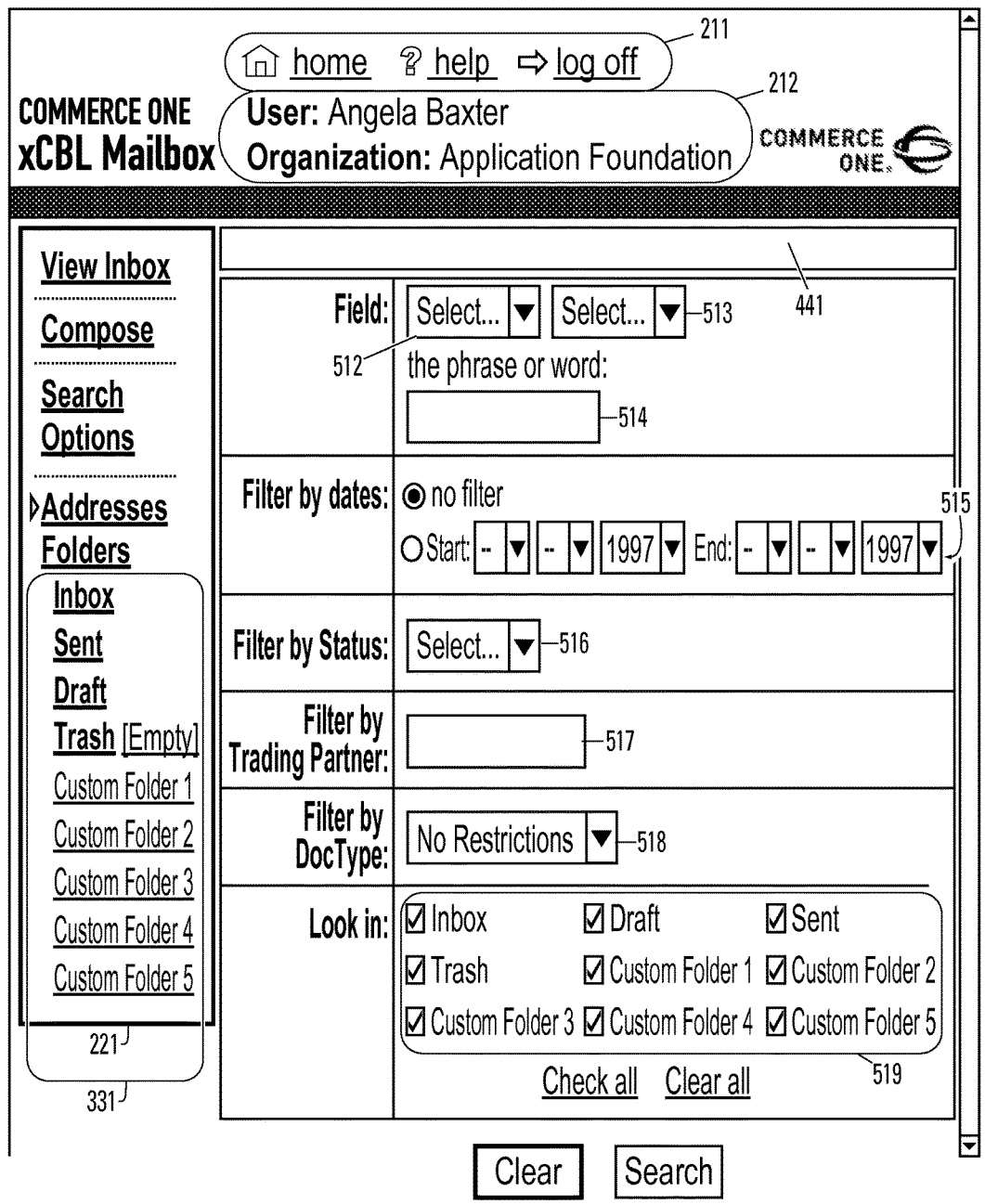
FIG. 5 is the sample screen display for searching on a selected document type, as part of a user interface.

FIG. 1 depicts a user interface view of a system for handling generic business documents exchanged among trading partners. This illustrates an environment in which aspects of the present invention may be practiced. A user of a document exchange system uses a computer, terminal or other workstation to access a login screen 111. Standard login and authentication protocols can be followed. After a successful login, a user is presented with an initial mailbox screen 112. FIG. 2 depicts a sample initial screen. The user's choices from the initial screen may include folder management 121, document searching 122, listing of documents in the selected folder 123 or selection of a particular document type of interest 124. Some of these options may be omitted or others may be added to a system. The folder management screen 121 provides typical functions for creating, deleting, renaming folders, etc. The document search screen 122 allows a user to select a document type and search on various criteria that are adapted to the selected document type. FIG. 5 depicts a sample search screen. The list of documents in a folder screen 123 can be reached from either the initial screen or from a document search screen. It provides various information about documents in a folder, as shown in FIG. 3. The document type selection screen 124 can be implemented to allow a user to create a document from scratch. When a user selects a particular type of document to compose, the system can respond with a document compose screen 134 that includes the fields to be completed.

From the list of documents in a folder screen, the user can export a document 131, read it 132, or use it as a basis for a new document 133, either by replying to or copying the base document. The document may be exported as an XML, PDF, CSV, HTML or other-formatted document. Standard or user-supplied export filters can be implemented.

The processing of a user request to view a document can be understood by reference to the co-pending application for A Method and Apparatus for Viewing Electronic Commerce-Related Documents at pp. 5-52 and the figures cited therein. In general, a series of style sheets can be constructed for displaying documents. These style sheets may be written in XSLT, or another transformation language applicable to the data type of the documents. A series of style sheets may be written, from generic to highly customized. A rule selector can be used to select among the available style sheets based on criteria such as document type, marketplace identity, sender identity, receiver identity, portal identity or other selected criteria. A directory tree, database or other data structure can be used to access style sheets based upon the criteria used.

Figure 4:
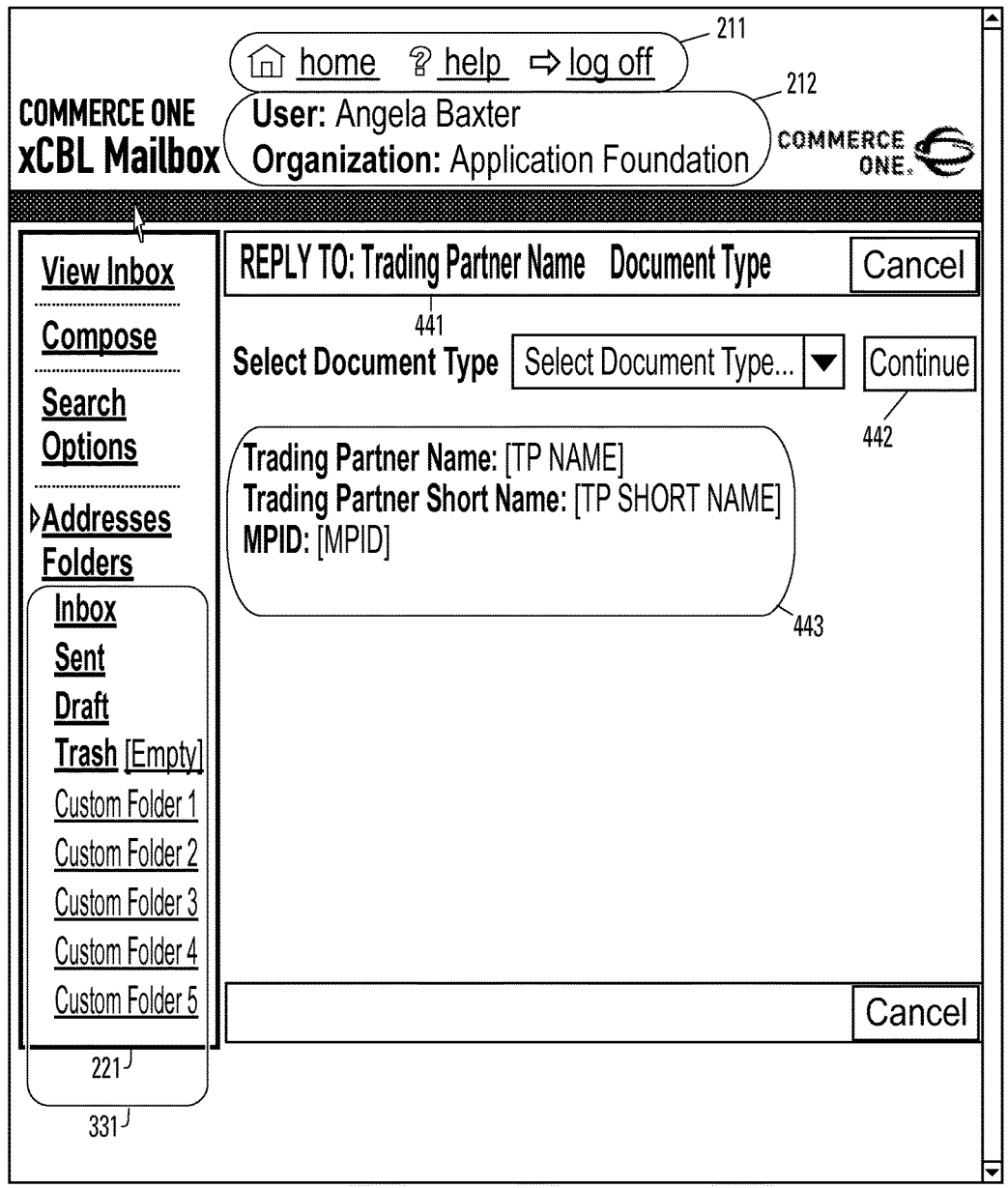
FIG. 4 is a sample screen display for a indicating a reply document type.

A user can select among document types for a resulting reply document 133. The available document types for a resulting reply document depend on the document type of the starting document type, for instance a starting document selected from a list of documents 123. FIG. 4 is a sample screen from which a user selects a document type 442 for a resulting reply document. The reply document type can be the same as the starting type, for instance when a user is copying and reusing a previous order as a template. The trading partner 443 may be identified by a full name, a short name and/or a unique identifier string.

FIG. 2 provides additional details of the folder management screen. The user is presented with standard screen functionality such as home, help and log off 211. The current user and user organization are presented in the header 212. This is helpful for users who may belong to more than one organization. Options for accessing additional screens, such as the in box, composing a document, searching, addressee's and folders are presented. For FIG. 2, the active option is folders. Several columns of information about folders are provided, including folder name 222, number of documents in a folder 223 and number of unread documents in the folder 224. Additional columns of information can be provided.

FIG. 3 provides additional details of the file list screen. General aspects of the screen follow the format of other screens, e.g. 211, 212, 221. The current folder being viewed and other folders available for view can be listed in the navigation box 331. The checkboxes 332 are provided for selecting individual documents to delete or to move to a folder. A column identifying the trading partners from whom documents originated 333 is provided. Date and time information and document types also are provided 334, 335. Icons for the document also can be provided 336. From the envelope icon, the user will know if the document has been read or not and also may know if it has been forwarded or replied to. From the export icon, the user can export the document. The same functionality can be provided for exporting a series of documents that have been checked. From the clip icon, the user can know if there are attachments associated with the document. The clip icon may allow direct access to a list of attachments or to the attachments themselves.

The document type selection screen of FIG. 4 can lead to either a search or a reply action, depending on the context. In FIG. 4, a trading partner name and document type may be described in the banner 441, if they have been selected. Selection of a document type provides a context for either searching or replying. FIG. 5 depicts a sample search screen that includes many of the same features as other sample screens, e.g., 211, 212, 221, and 331. One or more field selection filters 512, 513 are supplied. The values accessible by the pull down menus of these filters are context sensitive to a selected document type, if the document type is selected by a filter 518 or has been selected by context in a prior screen. Only the field types that are valid for a particular document type appear in the pull down menu, once a document type has been selected. One or more value specification fields 514 also are provided. These value specification fields are context sensitive to the document fields. The user's entry can be checked for format and data type as the user enters the data. The combination of field selection filters and value specification fields, context sensitive to the document type selected, enables a generic interface for searching across different document types. In addition to generic field handling, additional filters can be provided to search by date 515, document status 516, trading partner 517 or other field. A variety of interfaces can be used to implement these filters, such as pull down menus, radio buttons, checkboxes, or blanks to fill in. A list of folders to search in 519 can be dynamically generated, to match the list of folders in the navigation box 221, 331.

Figure 6:
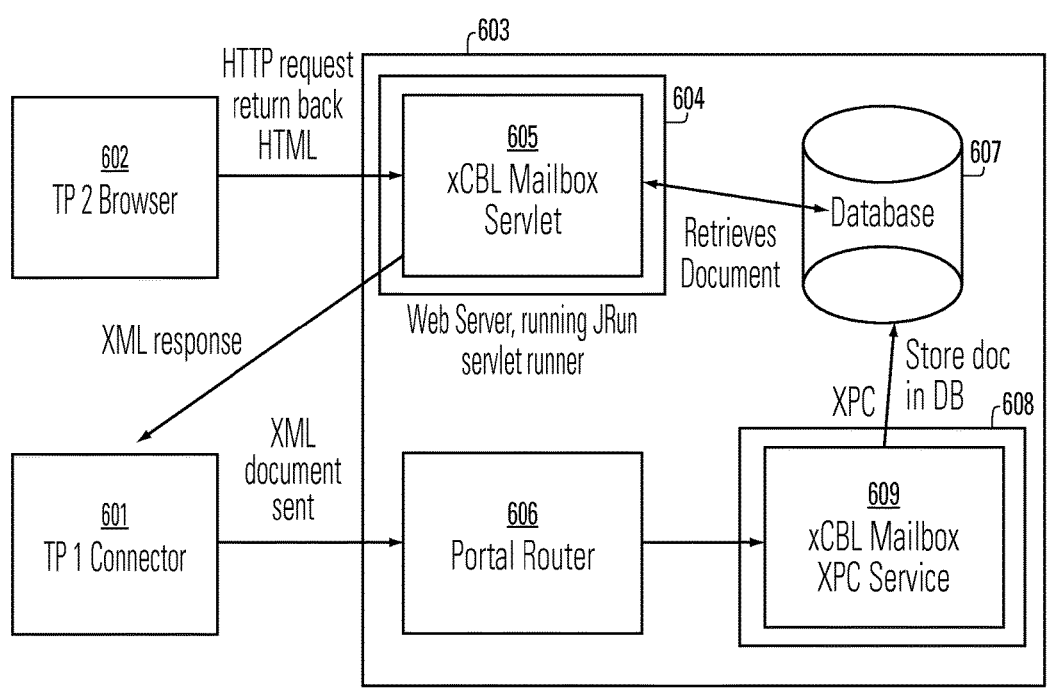
FIG. 6 is a block diagram of activities involving two trading partners communicating through a document exchange system.

FIG. 6 is a block diagram, at a very high level, depicting flow through activities related to exchange of documents between trading partners. A trading partner 601 using a connector sends a business document to a document router 606, which routes the document to a generic document handling service 609 within a service environment 608. The generic document handling service does some processing and, assuming no fatal error, stores the document inside database 607. Later, another trading partner 602 using a browser or other software adapted to communicate with the market site 603 accesses the Web server 604 running a document access servlet 605. The trading partner reads the document and, optionally, creates a response or uses the document as a basis for creating a new document. The second trading partner can access and create generic documents using a standard Web browser or other software. The servlet retrieves the starting document from the database 607. After a response or new document is created, the document can be sent to another trading partner 601. All of the functions of the market site 603 can be hosted on a single server. In some implementations, it is desirable to have separate servers for the router 606, the services 608, the database 607 and the Web servers 604. Additional servers or families of servers may be added for load balancing, high availability and/or security reasons.

Figure 7:
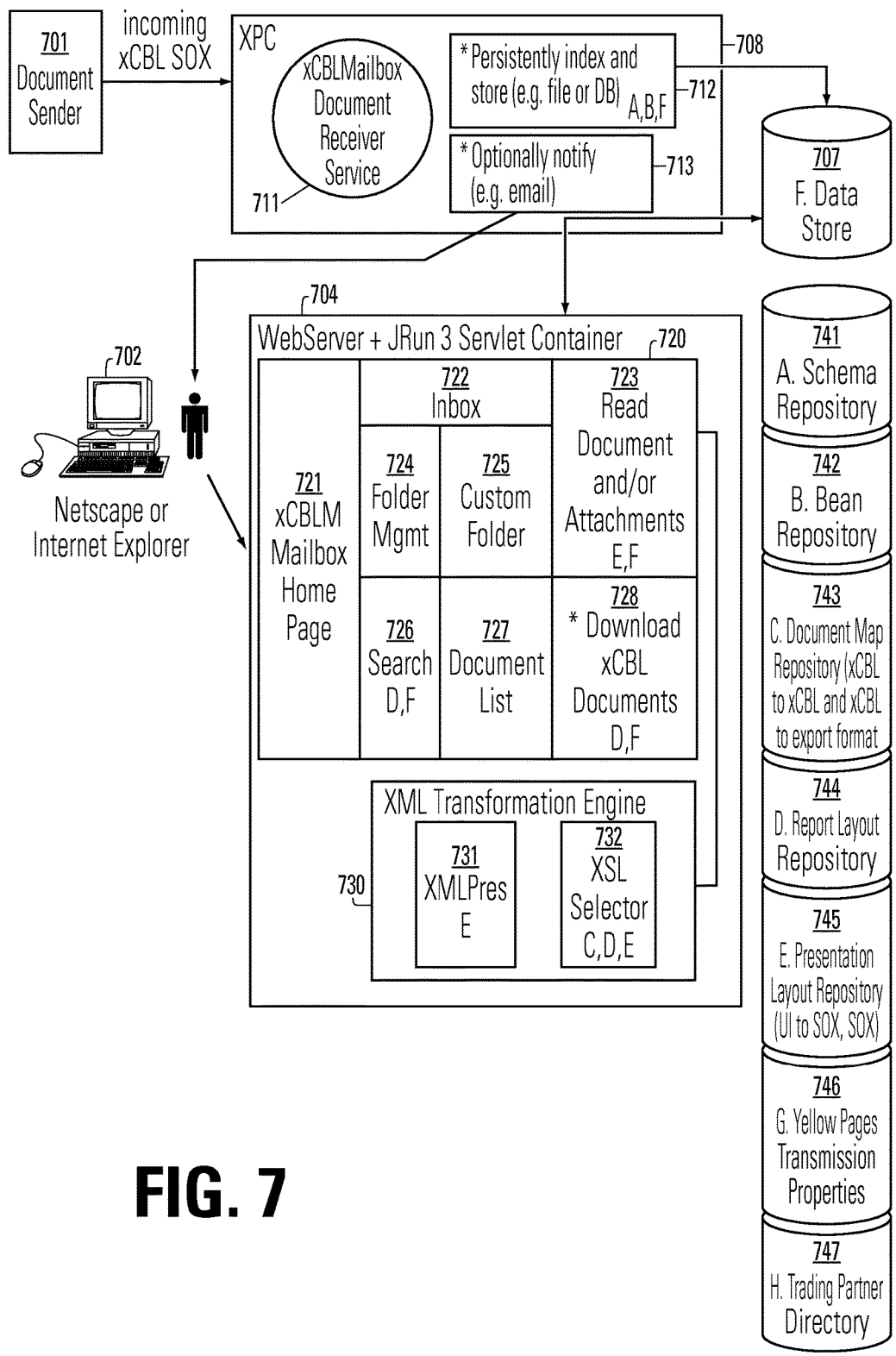
FIG. 7 is an application flow providing additional detail of activities involving two trading partners communicating through a document exchange system.

FIG. 7 is a block diagram depicting an alternative system. Interacting with the system are an entity 701 which sends a document to the system and a user 702 who interacts with the document stored by the system. The entity sends the document to a server 708 via router and communication channels that are not depicted in the figure. The document may reach the server 708 based on the addressee of the document or a combination of addressee and document type, or it may be sent directly to a location specified by the sender. For instance, a global directory may be published that identifies locations to which participants in a marketplace desire for various types of documents to be sent. The locations may be specified in the form of market participant IDs or URLs. A market participant may have multiple IDs or URLs.

Figure 8:
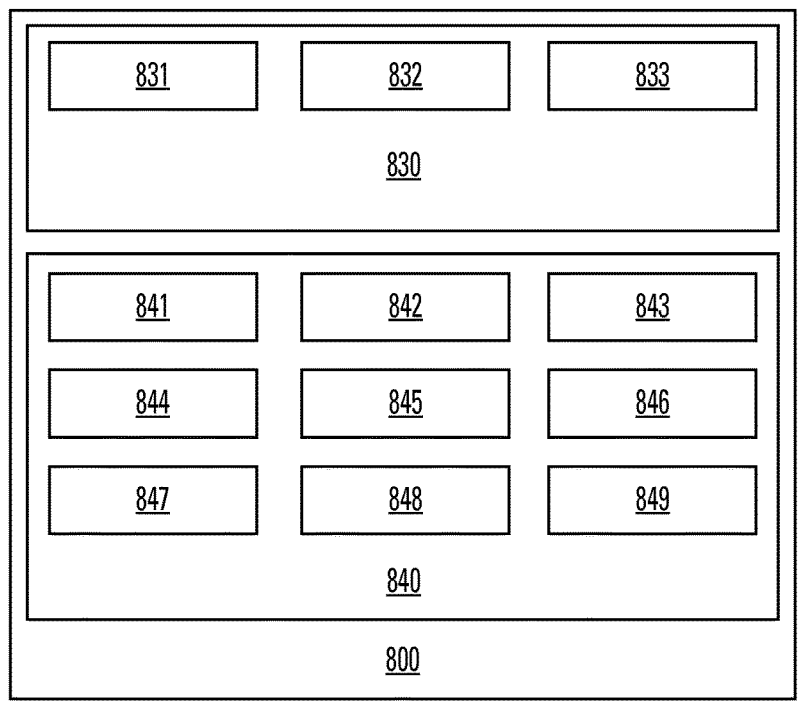
FIG. 8 is a block diagram of a self-describing, structured document.

A document being sent is typically a self-describing, structured document. XML documents are a common type of self-describing, structured documents. Fields within this document are self-describing, as the fields are tagged. A sample document having two different types of tagged fields is illustrated in FIG. 8. The document 800 may have one or more parts 830, 840. For instance, the document may include a MIME header and an XML body. A MIME header may be compliant with RFC 822. The header 830 includes a plurality of tagged fields 831-833. The body 840 also includes a plurality of tagged fields 841-849. Alternatively, the document may have only one part or one type of tagged fields. These tagged fields may comply with a schema, such as an xCBL schema by Commerce One or a CXML schema by Areba. A scheme is characterized by tagged fields having types and super types. Types inherit properties from the super types on which they are based. Types are defined based on their super types and having additional properties. Other standards to which tagged fields may comply include Sox by Commerce One, ECX, the 0AGI standard of Open Applications.org, the BizTalk standard by Microsoft, the Rosettanet standard by Rosetta Net.org, and EDT X12 A32.

Figure 9:
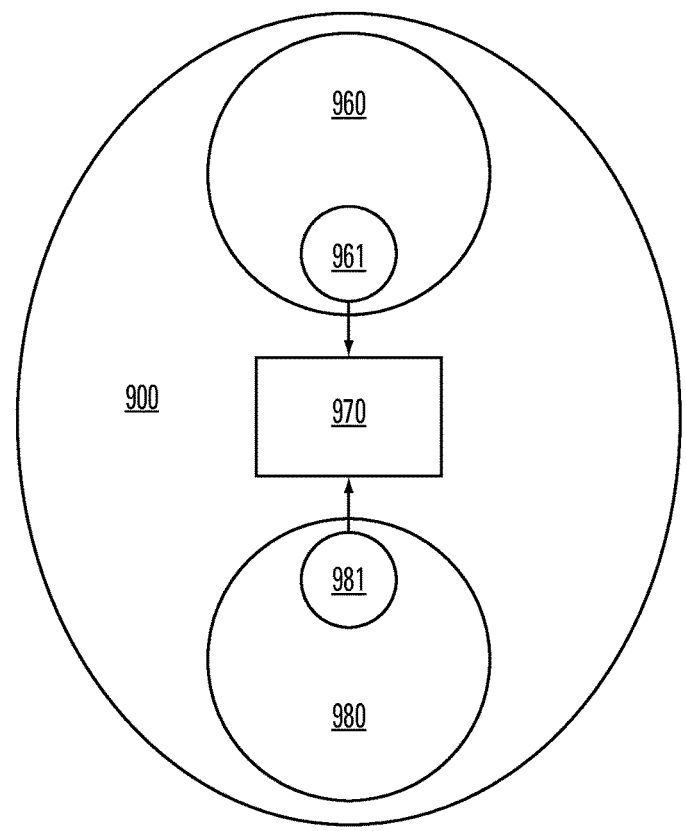
FIG. 9 illustrates participants in a marketplace.

Referring to FIG. 7, the entity which sent a document to the system 701 may be an electronic trading partner or otherwise an electronic correspondent of the entity to which user 702 belongs. The relationship of trading partners or electronic correspondence is illustrated in FIG. 9. The trading partners participate in the trading network 900. This network may be hosted by a single entity or it may be a collaboration of networks hosted by distinct entities. The trading partners may both use the same host or they may use different hosts which route messages among themselves. Two trading partners 860, 880 are illustrated. Participants on behalf of the trading partners 861, 381 may be systems or human beings. Referring again to FIG. 7, the entity 701 which sends the document to the server 708 may be either a system or a human being. Purchasing systems are examples of entities which generate self-describing, structured, tagged field documents and send them to systems.

On server 708, one or more services 711-713 may be available. One service may receive the document 711. The same or another service 712 may persistently store the incoming document, for instance in a database 707. One or more databases may be used to store data useful for electronic commerce or other document exchange. A database may include a repository of schemas 741 for standard and entity-defined business documents, a repository of JavaBeans 742, C++ structures, Pascal records or scripts useful to electronic commerce, a document map repository 743 for translation of documents from one format to another (e.g., the xCBL format to an export format) and for transformation of documents from one type to another (e.g., from a request for quotation to a quotation.) The database may further include a report layout repository 744 and a presentation layout repository 745. The presentation layout repository may include declarative transformations for changing documents from a Sox document format to an HTML format, and back again. The transmission properties data describes the transport information needed to sent a business document to a recipient. For example, SSL security credentials can be stored as transmission properties. A trading partner directory is also useful. The trading partner directory may, as described above, identify URLs to which the sending entity 701 transmits documents. The persistent storage for data 707, 741-47 may be on a single data storage unit or multiple units. Persistent document storage need not be part of a database. An indexed flat file would suffice to store XML-compliant documents. The services host 708 may also host an indexing service to index one or more of the tagged fields. Alternatively, a database system managing the persistent storage or other subsystem may index documents for retrieval. An incoming document may or may not be validated against schema from a schema repository 741, before it is persistently stored. A schema may be used to interpret the document. One or more JavaBeans or Scripps may be used to act on the document before it is stored.

Figure 10:
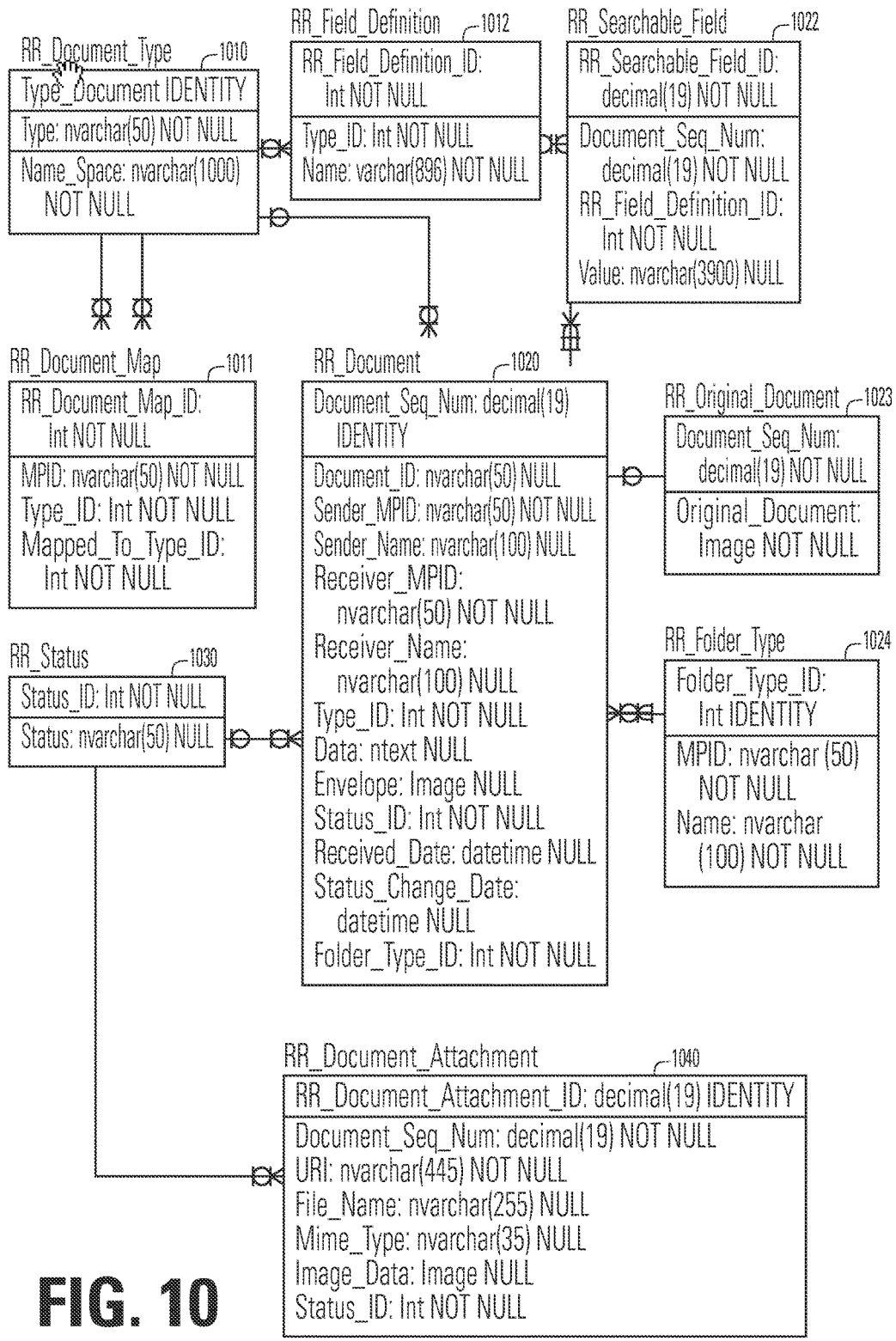
FIG. 10 is a database schema for a data structure that may be used to practice aspects of the present invention.

One schema for persistently stored documents is illustrated in FIG. 10. In this schema, a document and its header are captured in structure 1020. If this document is a copy or a reply based on an original document, the original document is stored in structure 1023. A copy or a reply document is associated with a special folder 1024. Document attachments are captured in structure 1040. Sets of valid document types and document statuses are maintained in structures 1010 and 1030, respectively. The one-to-many connections between structures 1010, 1030 and structure 1020 indicate that only one document type and one document status are allowed per document. To support searching, searchable fields are listed in a data structure 1012, and may be assigned unique or non-unique alias names. Information regarding searchable fields is listed in a separate data structure 1022. Other data arrangements may equally well practice aspects of the present invention.

Persistent storage of the incoming document may be accompanied by various processing steps. The original document, prior to normalizing, may be stored in a database. Envelope properties may be extracted from the envelope and normalized in a database or other storage. A predefined list of indexed fields, by document type, may be consulted and those fields indexed. Generic document properties, such as date and status, may be extracted from the envelope. The envelope itself may be separately stored. Attachments may be separately stored. Unneeded white space may be removed and name space abbreviations used to reduce storage requirements.

Returning to FIG. 7, the service 713 may advise the user 702 of receipt of the document by messaging, posting any other practical means. One or more users may be given notice, based on the identity of the sending entity, the identity of the receiving entity, the document type or other characteristics of the document. One syntax for subscription by a user is subscription=sender ID.recipient ID.document type. To receive all Order documents from a particular sending entity, a user could subscribe as follows: subscription=S1234.*.Order. This subscription would cause service 713 to notify user 702 of receipt of order type documents from sending entity S1234. Security features of the system would, of course, restrict access appropriately. Notice may be given by messaging, such as e-mail or Lotus Notes messaging. A message may include a subject, such as, "five new documents received," header text generally stating that new documents have been received or that old documents remain to be viewed. The e-mail may further include body text providing the date, number and sending party's identities for documents received. The body text may further provide detail regarding individual documents received, such as the document type, sender identity and date or time of receipt. The user interface may identify the location for viewing the document, such as by a click through URL.

Alternatively, notice may be given by posting at a location to which the user has access. A combination of notice formats may be used, such as posting followed by e-mail follow-up in the user does not promptly access listed documents. E-mails based on the status of accessing a document or a post notice may be sent periodically and may include increasingly strong wording or additional addresses, based on the type and/or aging of the received document.

A system 704 may be based upon a web server and a servlet container, for instance, compatible with JRun 3. A user interface application 721 may include a homepage 721, an in box 722, one or more services to read the document and/or its attachments 723, services for folder management 724, customized folders 725, searching for and listing documents. An additional service may provide access for downloading template documents 728. The web server may include Microsoft's WebServer software, a Java interpreter such as JRun 3 and a servlet container. A data storage interface may use the resources of a database. A first collection of services 720 is illustrated as being coupled with a transformation engine 730. The transformation engine may include selection logic 732 to select the style sheet for transformation purposes and transformation logic 731 which applies a style sheet to a document.

Figure 11:
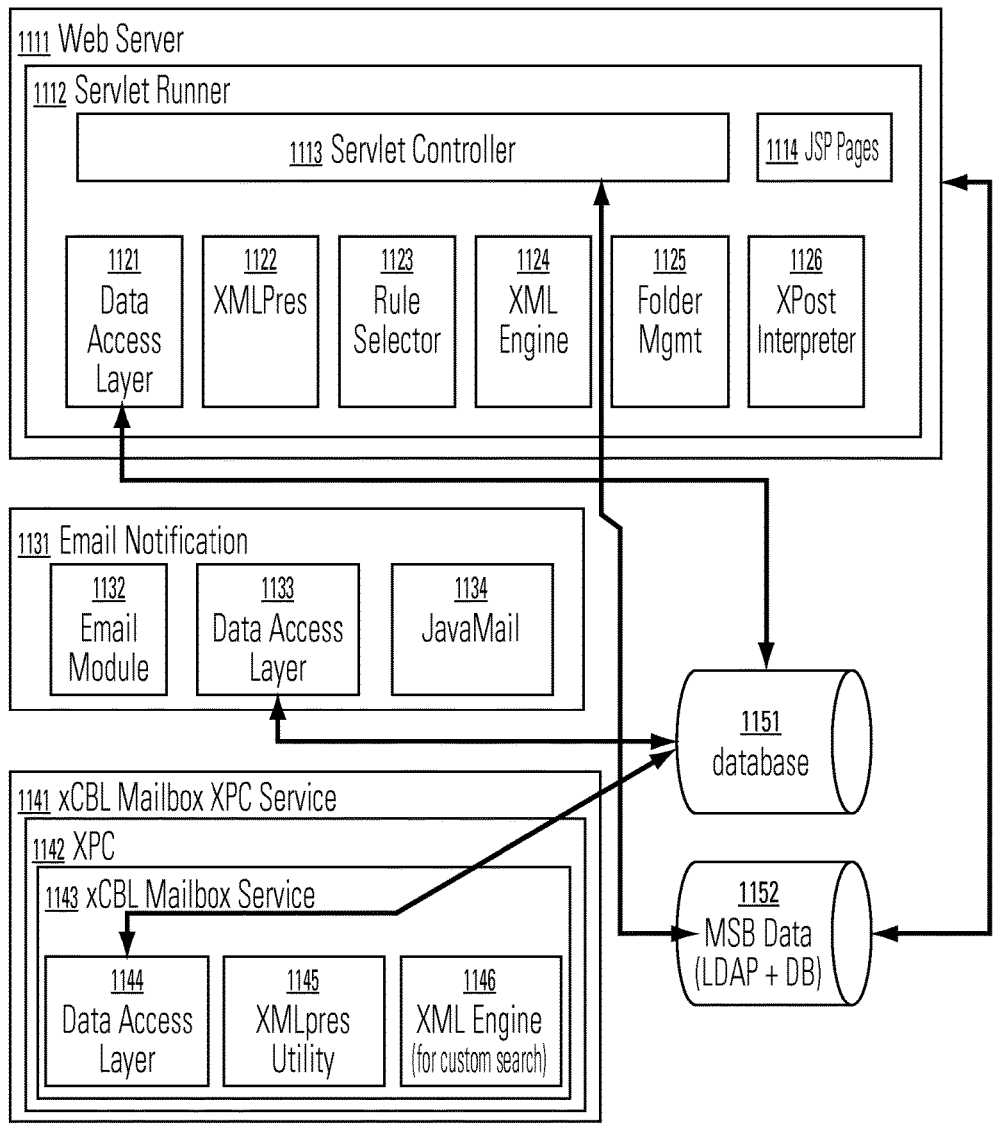
FIG. 11 is one architecture for software components that handle generic documents.

FIG. 11 depicts a further alternative environment in which aspects of the present invention can be practiced, similar to the environments depicted in FIGS. 6 and 7. A web server 1111 takes HTTP requests and makes HTTP responses. A generic document handling facility takes advantage of the web server resources through a program interface. One useful API is Sun Microsystems Java servlet. The so-called servlet technology provides a simple, consistent mechanism for providing access to web server services. A servlet written in Java can provide a component-based, platform-independent method for building Web-based applications. A single servlet application may be integrated with a variety of web-enabled application servers such as BEA WebLogic Application Server, IBM WebSphere, iPlanet Application Server others. Complementary to servlet technology is Java Server Pages (JSP) support 1114. The JSP technology is an extension of servlet technology that supports authoring of HTML and XML pages, JSP facilitates mixing dynamic content with static templates. JSP supports encapsulation of logic to generate content dynamically. The dynamic content logic can be accessed from the template page. The servlet runner 1112 resident on the web server may be JRun or a similar Java environment. Alternatively, a different program interface to the web server may be used with a different programming language. The servlet runner supports the servlet interface for access to the web server. The servlet runner supports the servlet controller 1113, invocation of JSP pages 1114, and a variety of applications 1121-26. Among these applications, the data access layer is an abstraction layer for access to the database 1151. The data access layer is present on each server or in each application environment that accesses the database 1133, 1144. XML-Pres 1122 is a style sheet engine that handles extended XSLT style sheets for transformation of XML into HTML. The rule selector 1123, as described in the co-pending application, provides access to default or a customized rules and templates that match parameter such as document type and trading partner. The XML engine parses and processes XML documents. For XML, records can be parsed and processed using DOM, SAX or any other programming model. Folder management is provided 1125. Software and resources for processing browser forms with embedded pass specifications are also provided 1126, as described further below.

E-mail notification 1131 may be structured with an e-mail module 1132, a data access layer 1133, and e-mail management routines. The e-mail module will utilize routines of the data access layer and the e-mail management library. Sun Microsystems provides a library of e-mail management routines complementary to its servlet technology. The overall generic document exchange service 1141 can be hosted within a services environment 1142. The generic document exchange service 11143 may include logic in resources for data access 1144, XML transformation is 1145 and XML searching and processing 1146. Data accessed and utilized by these routines may be stored in multiple databases 1151, 1152. A database of documents may be one component and market site data may be another, the market site data including a directory compliant with a lightweight directory access protocol.

Figure 12:
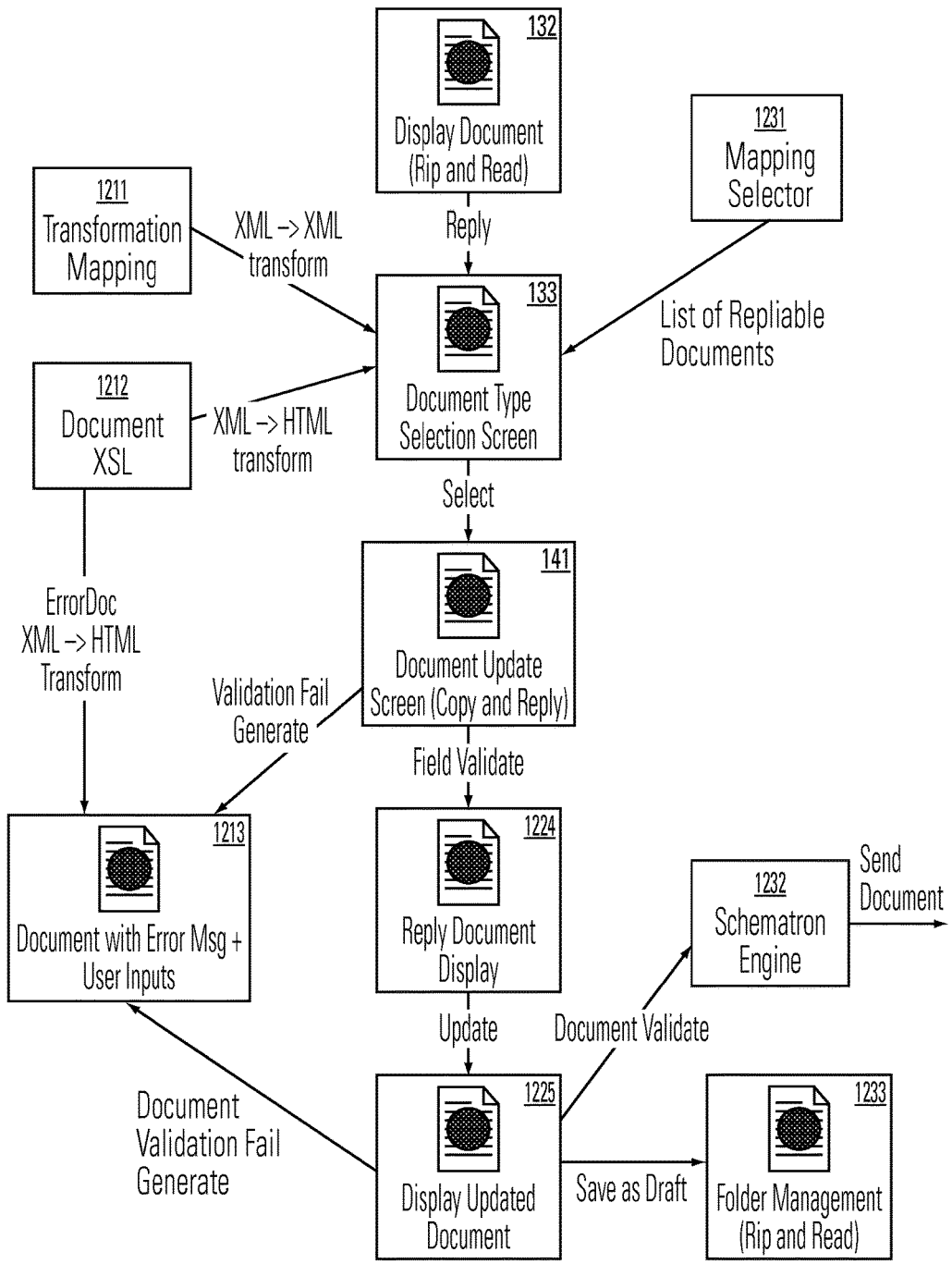
FIG. 12 is a user interface and processing diagram, including validation of user created documents.

FIG. 12 is a block diagram of a user interface and declarative data. This figure provides additional detail beyond the detail of FIG. 1. The initial three screens, for displaying a document 132, selecting a document type 133, and composing a reply or new document 141 are the same as in FIG. 1. FIG. 12 depicts the use of declarative data for a mapping selector 1231 for data transformation mapping 1211, and for display transformation 1212 in conjunction with the document type selection screen 133. The mapping selector 1231 provides a list of document types that can be produced from a selected starting document is accessed and incorporated in the user interface. The types of resulting documents that can be produced may depend on the marketplace, trading partner and other factors, as well as the document type of the starting document. From a starting document and selection of a document type for a resulting document, data transformation mapping 1211 is applied to generate a draft resulting document from the starting document. The transformation mapping should ensure that the resulting document is well formed, when the starting document is well formed. For XML to XML transformation, the declarative transformation mapping may take the form of an XSLT style sheet, potentially with extensions to XSLT. Other forms of declarative schema-to-schema mapping may also be used. Display transformation mapping utilizes declarative display format data 1121 to transform the underlying data for use in the user interface, for instance, to transform XML to HTML they can be viewed by a browser. Following document type selection 133, application of declarative data from a mapping selector, data transformation mapping, and display transformation mapping is used to produce a document updates screen 141. In one embodiment, application of one or more declarative transformations to the starting document produces a user interface form. The user interface form includes a plurality of path specifications for fields corresponding to the document type of the resulting document, starting values based on the starting document for at least some of the fields in the resulting document, and values to be completed for other fields in the resulting document. Field labels also may be included, either as data or along with other page formatting information. Alternatively, all of the fields may be populated and none left to be completed. Some fields may be editable and others not editable. The path specifications may conveniently be implemented as HTML hidden fields or otherwise as non-displaying fields. They can be displayed, for instance, for debugging. XPath is one convention that can be used for path specifications to nodes or fields within an XML, document. An alias for an XPath path specification also may be used, in conjunction with a lookup from the alias to the full path specification. Aliases can double as field labels.

Sample excerpts of a document to display transformation 1212 for a main processing routine and display of header information with embedded path specifications follows:

Default.xsl

```
<?xml version="1.0" ?>
- <xsl:style sheet version="1.0"
    xmlns:xsl="http://www.w3org/1999/XSL/Transform"
    xmlns:ext="http://www.commerceone.com/xmlpres" xmlns:cbl="
    urn:x-commerceone:
    document:com:commerceone:XCBL30:XCBL30.sox$1.0"
    xmlns:xm="http://www.commerceone.com/xcblmailbox">
  <xsl:include href="schematronerror.xsl" />
  <xsl:include href="header_display.xsl" />
  <xsl:include href="detail_display.xsl" />
  <xsl:include href="summary_display.xsl" />
  <xsl:include href="Ir:Quote:Quote_variable.xsl$1.0" />
  <xsl:decimal-format name="DEIT" decimal-separator="," grouping-
    separator="." />
  <xsl:decimal-format name="FR" decimal-separator="," grouping -
    separator="" />
- <xsl:template match="/">
- <!--
   This is for displaying Schematron errors
  -->
- <xsl:if test="string($xm:hasSchematron)='true'">
    <xsl:variable name="results" select="document('error:///
      schematronConformance.xml')" />
  - <xsl:call-template name="ErrorDisplayer">
      <xsl:with-param name="confdoc" select="$results" />
      <xsl:with-param name="idmap" select="$schematronmaps" /
    </xsl:call-template>
  </xsl:if>
- <!--
   If the xml instance has error, display error fields with
   field validation error
  -->
 - <xsl:choose>
  - <xsl:when test="string($xm:hasError)='true'">
      <xsl:variable name="ErrorDocument" select="document'error:/
        //inMemoryError')"/>
    - <xsl:variable name="Prefixes">
        <empty />
      </xsl:variable>
    - <xsl:call-template name="DisplayHeader_Error">
<xsl:with-param name="Prefixes" seleci="$Prefixes" />
<xsl:with-param name="ErrorDocument"
select="$ErrorDocument"/>
<xsl:with-param name="ErrorCodeMaps" select="$codemaps"
/>
</xsl:call-template>
- <xsl:call-template name="DisplayDetail_Error">
<xsl:with-param name="Prefixes" select="$Prefixes" />
      <xsl:with-param name="ErrorDocument"
        select="$ErrorDocument" />
      <xsl:with-param name="ErrorCodeMaps" select="$codemaps"
        />
    </xsl:call-template>
    <xsl:call-template name="DisplaySummary" />
  </xsl:when>
  - <!--
   If the xml instance doesn't contain error, display all
   fields without any error
  -->
  - <xsl:otherwise>
      <xsl:call-template name="DisplayHeader_NoError" />
      <xs1:call-templaie name="DisplayDetail_NoError" />
      <xsl:call-templaie name="DisplaySummary" />
    </xsl:otherwise>
   </xsl:choose>
  </xs/:template>
 </xsl:style sheet>
```
Header display.xsl

```
<?xml version="1.0" encoding="UTF-8" ?>
- <xsl:style sheet version="1.0"
    xmlns:xsl="http://www.w3.org/1999/XSL/Transform"
    xmlns:ext="http://www.commerceone.com/xmlpres" xmlns:cbl="
    urn:x-commerceone:
```

```
document:com:commerceone:XCBL30:XCBL30.sox$1.0"
  xmlns:xm="http://www.commerceone.com/xcblmailbox">
  <xsl:include href="error.xsl" />
<xsl:include href="header_party_display.xsl" />
- <xsl:template name="DisplayHeader_Error">
  - <!--
    This is the prefix to namespace bindings used in the
    location
    -->
  <xsl:param name="Prefixes" />
  - <!--
    This is the error document to retrieve errors from
    -->
  <xsl:param name="ErrorDocument" />
  - <!--
    This is a result tree fragment that maps error codes
    to localized descriptions
    -->
  <xsl:param name="ErrorCodeMaps" />
- <TABLE cellpadding="1" cellspacing="0" border="0" width="100%">
  - <TR class="ListHeader">
    - <TD align="left" colspan="2" class="ListHeaderText">
        <xsl:value-of select="$QuoteHeader" />
      </TD>
    </TR>
  - <TR>
    - <TD class="StatusHeaderSmaliNew" width="50%">
        <span class="RequiredField">*</span>
        <xsl:value-of select="$QuoteRefNum" />
      </TD>
    - <TD class="StatusHeaderSmallNew" width="50%">
        <span class="RequiredField">*</span>
        <xsl:value-of select="$QuoteIssueDate" />
        (
        <xsl:value-of select="string($xm:DATETIMEMASK)" />
        )
      </TD>
    </TR>
  - <TR>
    - <TD class="ElementStyle" width="50%">
        <xsl:variable name="xpath">/Quote/QuoteHeader/QuoteID/
          Reference/RefNum</xsl:variable>
        <input type="hidden" name="{concat('XPostChange:', $xpath)}"
          value="" />
        <input class="ElementStyle" type="text"
          name="{concat('XPostContent:', $xpath)}" value="{cbl:Quote/
          cbl:QuoteHeader/cbl:QuoteID/cbl:Reference/cbl:RefNum}"
          size="20"
          onChange="javascript:setModified('{concat('XPostChange:',
          $xpath)}');" />
      - <xsl:variable name="RefNumErrors">
        - <xsl:call-template name="ErrorDetector">
            <xsl:with-param name="Location"
              select="7Quote/QuoteHeader/QuoteID/Reference/RefNum
              "" />
            <xsl:with-param name="Prefixes" select="$Prefixes" />
            <xsl:with-param name="ErrorDocument"
              select="$ErrorDocument"/>
            <xsl:with-param name="ErrorCodeMaps"
              select="$ErrorCodeMaps" />
          </xsl:call-template>
        </xsl:variable>
      - <xsl:if
          test="string($RefNumErrors)!=string($NotMappedConstant)"
          >
        - <span class="ErrorTextSmall">
            [
            <xsl:value-of select="$Error" />
            <xsl:value-of select="$RefNumErrors" />
            ]:
          </span>
        </xsl:if>
      </TD>
    - <TD class="ElementStyle" width="50%">
        <xsl:variable name="xpath">/Quote/QuoteHeader/
          QuoteIssueDate</xsl:variable>
        <input type="hidden" name="{concat('XPostChange:', $xpath)}"
          value="" />
      - <xsl:variable name="DateErrors">
        - <xsl:call-template name="ErrorDetector">
            <xsl:with-param name="Location" select= ""
              QuoteHeader/QuoteIssueDate" I>
            <xsl:with-param name="Prefixes" select="$Prefixes" />
            <xsl:with-param name="ErrorDocument"
              select="$ErrorDocument" />
            <xsl:with-param name="ErrorCodeMaps"
              select="$ErrorCodeMaps" />
          </xsl:call-template>
        </xsl:variable>
        <xsl:param name="date" select="cbi:Quote/
          cbl:QuoteHeadericbl:QuoteissueDate" />
      - <xsl:param name="QuoteIssuedDate">
          <ce:lookup xmlns:ce="http://www.commerceone.comixslt/
            extensions" xmlns:maillookup="urn:rnailbox:lookup"
            mapname="maillookup:DateTimeFormatter" value="$date"
            errorvalue="Can not mapped" />
        </xsl:param>
      - <xsl:choose>
        - <xsl:when
            test="string($DateErrors)!=string($NotMappedConstant)">
            <input class="ElementStyle" type="text"
              name="{concat(XPostContent:', $xpath)}"
              value="{cbl:Quote/
              cbl:QuoteHeader/cbl:QuoteIssueDate}" size="15"
              onChange="javascript:setModified('{concat('XPostChang
              e:', $xpath)}');" />
          - <span class="ErrorTextSmall">
              [
              <xsl:value-of select="$Error" />
              <xsl:value-of select="$DateErrors" />
              ]:
            </span>
          </xsl:when>
        - <xsl:otherwise>
            <input class="ElementStyle" type="text"
              name="{concat('XPostContent:', $xpath)}"
              value="{SQuoteIssuedDate}" size="15"
              onChange="javascript:setModified('{concat('CXPostChang
              e:', $xpath)}');" />
          </xsl:otherwise>
        </xsl:choose>
      </TD>
    </TR>
    <xsl:call-template name="DisplayParty" />
  </TABLE>
  <img src="../img/spacer.gif" alt="" height="5" width="1" />
  <BR />
</xsl:template>
- <xsl:template name="DisplayHeader_NoError">
  - <TABLE cellpadding="1" cellspacing="0" border="0" width="100%">
    - <TR class="ListHeader">
      - <TD align="left" colspan="2" class="ListHeaderText">
          <xsl:value-of select="$QuoteHeader" />
        </TD>
      </TR>
    - <TR>
      - <TD class="StatusHeaderSmallNew" width="50%">
          <span class="RequiredField">*</span>
          <xsl:value-of select="$QuoteRefNum" />
        </TD>
      - <TD class="StatusHeaderSmallNew" width="50%">
          <span class="RequiredField">*</span>
          <xsl:value-of select="$QuoteIssueDate" />
          (
          <xsl:value-of select="string($xm:DATETIMEMASK)" />
          )
        </TD>
      </TR>
    - <TR>
      - <TD class="ElementStyle" width="50%">
          <xsl:variable name="xpath">/Quote/QuoteHeader/QuoteID/
            Reference/RefNum</xsl:variable>
          <input type="hidden" name="{concat('XPostChange:', $xpath)}"
            value="" />
          <input class="ElementStyle" type="text"
            name="{concat('XPostContent:', $xpath)}" value="(cbl:Quote/
            cbl:QuoteHeader/cbl:QuoteID/cbl:Reference/cbl:RefNum}"
            size="20"
            onChange="javascript:setModified('{concat('XPostChange:',
```

```
       $xpath)}');" />
    </TD>
  - <TD class="ElementStyle" width="50%">
      <xsl:param name="date" select="cbl:Quote/
         cbl:QuoteHeader/cbl:QuoteIssueDate" />
      <xsl:variable name="xpath">/Quote/QuoteHeader/
         QuoteIssueDate</xsl:variable>
      <input type="hidden" name="{concat('XPostChange:' $xpath)}"
         value="" />
    - <xsl:param name="QuoteIssuedDate">
       <ce:lookup xmlns:ce="http://www.commerceone.com/xslt/
         extensions" xmlns:maillookup="urn:mailbox:lookup"
         mapname="maillookup:DateTimeFormatter" value="$date"
         errorvalue="Can not mapped" />
      </xsl:param>
      <input class="ElementStyle" type="text"
         name="{concat('XPostContent:', $xpath)}"
         value="{$QuoteIsuedDate}" size="15"
         onChange="javascript:setModified('(concat('XPostChange:',
         $xpath)}');" />
    </TD>
  </TR>
  <xsl:call-template name="DisplayParty" />
  <img src="../img/specer.gif" alt="" height="5" width="1" />
  <BR />
  </TABLE>
</xsl:template>
</xsl:style sheet>
```

A draft resulting document also may be generated, in the process of producing the user form. This document may be produced according to a declarative transformation of a starting XML document into a draft resulting XML document. The draft resulting document may include starting values from the starting document. It also may include default values for some fields and directions for completing other fields. The draft resulting document may be stored in memory according to a document-Object-model (DOM) or another tree-based representation. Alternatively, the draft resulting document may be stored on disk or in memory in a form compatible with Simple API for XML (SAX or SAX2) or another event-based access model. Or, an event-based API can be used to construct a tree, or traverse an in-memory tree. When a draft resulting document is generated, in addition to a form, the draft resulting document may be maintained in memory while the user works from the form and a document ID can be maintained with other state information for the draft resulting document. Alternatively, a document ID and related information can be transmitted with the user form, even in a stateless fashion, and the draft resulting document constructed after the user's updating of the form. A draft resulting document can be transformed with a display transformation to generate the user form. The display transformation may be generated with an XSLT style sheet or another set of declarative data.

Sample excerpts of a document to document transformation 1211 from a request for quotation to quotation follows, including portions of a main processing routine and a party copy routine:

Default.xsl

```
- <xsl:style sheet version="1.0"
      xmlns:xsl="http://www.w3.org/1999/XSL/Transform"
      xmlns:ext="http://www.commerceone.com/xmlpres" xmlns:cbl="urn:x-
      commerceone: document:com:commerceone:XCBL30:XCBL30.sox$1.0"
      xmlns:xm="http://www.commerceone.com/xcblmailbox">
   <xsl:output method="xml" indent="yes" omit-xmldeclaration="yes" />
   <xsl:include href="reference_copy.xsl" />
   <xsl:include href="party_copy.xsl" />
   <xsl:include href="lineitemnum_copy.xsl" />
   <xsl:include href="itemidentifiers_copy.xsl" />
   <xsl:include href="identifier_copy.xsl" />
   <xsl:include href="totalquantity_copy.xsl" />
 - <xsl:template match="/">
    - <xsl:processing-instruction name="soxtype">
        <xsl:text>urn:xcommerceone:
           document:com:commerceone:XCBL30:XCBL30.sox$1.0</xsl:text>
      </xsl:processing-instruction>
    - <Quote>
        <xsl:apply-templates select="cbl:RequestForQuotation/
           cbl:RequestQuoteHeader" />
        <xsl:apply-templates select="cbl:RequestForQuotation/
           cbl:ListOfRequestQuoteDetails" />
        <xsl:apply-templates select="cbl:RequestForQuotation/
           cbl:RequestQuoteSummary" />
```

```xml
        </Quote>
    </xsl:template>
    <xsl:template match="cbl:RequestQuoteHeader">
        <xsl:call-template name="OutputQuoteHeader" />
    </xsl:template>
    <xsl:template match="cbl:ListOfRequestQuoteDetails">
        <xsl:call-template name="OutputListOfQuoteDetails" />
    </xsl:template>
    <xsl:template match="cbl:RequestQuoteSummary">
        <xsl:call-template name="OutputQuoteSummary" />
    </xsl:template>
    <xsl:template name="OutputQuoteHeader">
        <QuoteHeader>
            <QuoteIssueDate />
            <QuoteID>
                <xsl:apply-templates select="cbl:RequestQuoteID" />
            </QuoteID>
            <QuoteParty>
                <xsl:apply-templates select="cbl:RequestQuoteParty" />
            </QuoteParty>
            <xsl:call-template name="OutputQuoteCurrency" />
            <xsl:call-template name="OutputQuoteTermsOfPayment" />
        </QuoteHeader>
    </xsl:template>
    <xsl:template name="OutputListOfQuoteDetails">
        <ListOfQuoteDetails>
            <xsl:for-each select="cbl:RequestQuoteDetails">
                <QuoteDetails>
                    <xsl:call-template name="OutputQuoteItemType" />
                    <xsl:call-template name="OutputQuoteItemDetail" />
                </QuoteDetails>
            </xsl:for-each>
        </ListOfQuoteDetails>
    </xsl:template>
    <xsl:template name="OutputQuoteSummary">
        <QuoteSummary>
            <xsl:copy-of select="cbl:TotalNumberOfLineItems" />
        </QuoteSummary>
    </xsl:template>
    <xsl:template name="OutputQuoteItemType">
        <QuoteItemType>
            <QuoteType>
                <QuoteTypeCoded />
            </QuoteType>
        </QuoteItemType>
    </xsl:template>
    <xsl:template name="OutputQuoteItemDetail">
        <QuoteItemDetail>
```

```xml
<xsl:apply-templates
    select="cbl:RequestQuoteItemDetail/cbl:BaseItemDetail" />
  </QuoteItemDetail>
  <QuotePricingDetail>
    <PricingDetail>
      <ListOfPrice>
        <Price>
          <UnitPrice>
            <UnitPriceValue />
            <UnitOfMeasurement>
              <UOMCoded />
            </UnitOfMeasurement>
          </UnitPrice>
        </Price>
      </ListOfPrice>
      <TotalValue>
        <MonetaryValue>
          <MonetaryAmount />
        </MonetaryValue>
      </TotalValue>
    </PricingDetail>
  </QuotePricingDetail>
</xsl:template>
<xsl:template match="cbl:BaseItemDetail">
  <xsl:call-template name="CopyLineItemNum" />
  <xsl:call-template name="CopyItemIdentifiers" />
  <xsl:call-template name="CopyTotalQuantity" />
</xsl:template>
<xsl:template name="OutputQuoteCurrency">
  <xsl:if test="cbl:RequestQuoteCurrency/cbl:Currency/
      cbl:CurrencyCoded">
    <QuoteCurrency>
      <xsl:copy-of select="cbl:RequestQuoteCurrency/ cbl:Currency" />
    </QuoteCurrency>
  </xsl:if>
</xsl:template>
<xsl:template name="OutputQuoteTermsOfPayment">
  <xsl:if test="cbl:RequestQuoteTermsOfPayment">
    <QuoteTermsOfPayment>
      <PaymentInstructions>
        <xsl:call-template name="OutputQuotePaymentTerms" />
        <xsl:call-template name="OutputQuotePaymentMethod" />
      </PaymentInstructions>
    </QuoteTermsOfPayment>
  </xsl:if>
</xsl:template>
<xsl:template name="OutputQuotePaymentTerms">
```

```xml
<xsl:for-each
    select="cbl:RequestQuoteTermsOfPayment/cbl:PaymentInstructions/
    cbl:PaymentTerms">
  <PaymentTerms>
    <xsl:for-each select="cbl:PaymentTerm">
      <PaymentTerm>
        <xsl:copy-of select="cbl:PaymentTermCoded" />
        <xsl:copy-of select="cbl:PaymentTermCodedOther" />
        <xsl:copy-of select="cbl:PaymentTermValue" />
        <xsl:copy-of select="cbl:PaymentTermDetails" />
      </PaymentTerm>
    </xsl:for-each>
  </PaymentTerms>
</xsl:for-each>
</xsl:template>
<xsl:template name="OutputQuotePaymentMethod">
  <xsl:for-each select="cbl:RequestQuoteTermsOfPayment/
      cbl:PaymentInstructions/cbl:PaymentMethod">
    <PaymentMethod>
      <xsl:copy-of select="cbl:PaymentMeanCoded" />
      <xsl:copy-of select="cbl:PaymentMeanCodedOther" />
      <xsl:copy-of select="cbl:PaymentMeanReference" />
      <xsl:copy-of select="cbl:PaymentSystemCoded" />
      <xsl:copy-of select="cbl:PaymentSystemCodedOther" />
      <xsl:copy-of select="cbl:OriginatingFIAccount" />
      <xsl:copy-of select="cbl:ReceivingFIAccount" />
      <xsl:copy-of select="cbl:CardInfo" />
    </PaymentMethod>
  </xsl:for-each>
</xsl:template>
<xsl:template match="cbl:RequestQuoteID">
  <xsl:call-template name="CopyReference" />
</xsl:template>
<xsl:template match="cbl:RequestQuoteParty">
  <OrderParty>
    <BuyerParty>
      <xsl:apply-templates select="cbl:OrderParty/
          cbl:BuyerParty/cbl:Party" />
    </BuyerParty>
    <SellerParty>
      <xsl:apply-templates select="cbl:OrderParty/
          cbl:SellerParty/cbl:Party" />
    </SellerParty>
  </OrderParty>
</xsl:template>
<xsl:template match="cbl:Party">
  <xsl:call-template name="CopyParty" />
</xsl:template>
</xsl:style sheet>
```

Party_copy.xsl

```xml
- <xsl:style sheet version="1.0"
    xmlns:xsl="http://www.w3.org/1999/XSL/Transform"
    xmlns:ext="http://www.commerceone.com/xmlpres" xmlns:cbl="urn:x-
    commerceone: document:com:commerceone:XCBL30:XCBL30.sox$1.0"
    xmlns:xm="http://www.commerceone.com/xcblmailbox">
  - <xsl:template name="CopyParty">
    - <Party>
        <xsl:apply-templates select="cbl:PartyID" />
        <xsl:call-template name="CopyNameAddress" />
      </Party>
    </xsl:template>
  - <xsl:template match="cbl:PartyID">
    - <PartyID>
        <xsl:apply-templates select="cbl:Identifier" />
      </PartyID>
    </xsl:template>
  - <xsl:template name="CopyNameAddress">
      <xsl:copy-of select="cbl:NameAddress" />
    </xsl:template>
</xsl:style sheet>
```

The user acts upon the form 141. Fields are added, completed or changed. More than one iteration may be required, for instance, if a user adds a line item to a quotation. When the user is ready, the form is posted to the server for validation. One or more types of validation can be applied, such as field validation against a schema (e.g., for well-formedness and valid ranges) and business processing validation against a rule base. For instance, a SOX-compliant xCBL schema and a set of Schematron rules can be used for validation. In FIG. 12, the flow branches from 141 depending on whether field validation is error free. An error free field validation is displayed 1224 with a message. A document containing field errors results in generation of an error document that is merged for display with the original document by a declarative transformation 1212, thereby displaying validation errors in the same user interface as the document being edited 1213. The user's actions may be iterative, to correct one or more errors before repeating field validation. The user may be presented 1225 with further options of validating the document against business processing rules applicable to one or more trading partners or of saving the document as a draft 1233. Alternatively, the multiple types of validations may be performed on the same document, without repeated user requests for validation. In one embodiment, business processing rules are applied by a Schematron engine 1232.

Figure 13:
FIG. 13 is a user interface for replying to a request for quote with a quote.

Excerpts from a sample of a user form 141 that produced the sample screen in FIG. 13 follow:

```
<!-- --------------------------- start Mailbox20.jsp --------------------- -->

<HTML>
<HEAD>
  <TITLE>xCBL Mailbox 2.0</TITLE>

<LINK href='../css/main.css' rel=STYLE SHEET type=text/css>
</HEAD>
<BODY bgColor=#ffffff leftMargin=0 rightMargin=0 topMargin=0
MARGINWIDTH="0" MARGINHEIGHT="0">

<script language="javascript" src="../waiting.js">
</script>
<script language="javascript" src="../displayhelp.js">
</script>

<!-- --------------------------- start logo.jsp -------------------------- -->

<TABLE border=0 cellPadding=0 cellSpacing=0 width="100%">
 <TR>
   <TD class=navigation colSpan=3 height=2><IMG height=1
     src='../img/spacer.gif' width=1></TD></TR>
 <TR>
   <TD width="27%"><IMG height=52 src="../img/hleftlogo.gif"></TD>
   <TD noWrap width="45%">
```

\*\*\*

```
</script>
<!-- --------------------------- end logo.jsp ---------------------------->

<TABLE border=0 cellPadding=0 cellSpacing=0 width="100%">
    <TR class=topcell>
      <TD height=18><IMG height=1 src='../img/spacer.gif' width=1> </TD>
      <TD height=18 align="right" class="HomeLink">
        <A href="XMServlet?webaction=Init" class="HomeLink">
         xCBL Mailbox</A>  </TD></TR>
  </TABLE>
  <TABLE align=center border=0 cellPadding=2 width="100%"><TBODY>
   <TR>
     <TD align=middle bgColor=#e9ecef vAlign=top width="20%">

<!-- --------------------------- start left_nav.jsp ---------------------->
```

```
<TABLE border=0 cellPadding=2 cellSpacing=0 width="90%"><TBODY>
  <TR>
    <TD align=middle bgColor=#000000>
    <TABLE border=0 cellPadding=0 cellSpacing=0 width="100%" class="LeftNav">
      <TR>
        <TD colSpan=2><IMG border=0 height=3 src='../img/spacer.gif' width=1></TD></TR>
      <TR>
        <TD align=middle> </TD>
        <TD align=left class="BoldText">
        <A href='XMServlet?webaction=FdrActionGetDocList&Folder_go_folder=1'>
          View Inbox</A></TD></TR>
```

\*\*\*

```
        <TD colSpan=2><IMG border=0 height=3 src='../img/spacer.gif' width=1></TD></TR>

<!-------------------------------- start folder_index.jsp ---------------------->

<FORM method="POST" name='folder_index' action='XMServlet?webaction=Init'>
  <TR>
    <TD align=left vAlign=bottom> </TD>
    <TD align=left class="BoldText">

<A href="XMServlet?webaction=FdrActionShowMgmt">
      Folders</A></TD></TR>
```

\*\*\*

```
          </TD></TR></TABLE></TD></TR>

<TR>
    <TD align=left vAlign=bottom> </TD>
    <TD vAlign=top>
      <table cellpadding=0 cellspacing=0 border=0 class="LeftNav">
        <TR>
          <TD class="SmallText">

<A href="XMServlet?webaction=FdrActionGetDocList&Folder_go_folder=14">RollsRoyce</A>
```

```
    </TD></TR></TABLE></TD></TR>

<INPUT name='Folder_reload' type=hidden value="FALSE" ></INPUT>
  <INPUT name='folder_empty_trash' type=hidden value="FALSE" ></INPUT>
  <INPUT name='folder_previous_action' type=hidden value='unknown'></INPUT>
  <INPUT name='Folder_current_folder' type=hidden value='1'></INPUT>
  <INPUT name='Folder_go_folder' type=hidden value='1'></INPUT>
</FORM>
<!---------------------------- end folder_index.jsp ---------------------->

<script language="JavaScript">
<!--
function emptyTrash() {
   if(confirm('Empty trash?')) {
      document.folder_index.folder_empty_trash.value = "TRUE";

document.folder_index.action="XMServlet?webaction=FdrActionEmptyTrash";
      document.folder_index.Folder_go_folder.value = "4";
      document.folder_index.submit();
   }
}
//-->
</script>

<TR>
       <TD colSpan=2><IMG border=0 height=3 src='../img/spacer.gif' width=1></TD></TR>
     </TABLE></TD></TR>
</TABLE>
<!---------------------------- end left_nav.jsp ------------------------------>

</TD>
    <TD class=DisplayArea vAlign=top width="80%">

<!-- Begin MAIN CONTENT CELL -->

<FORM ACTION="XMServlet?webaction=XMPrintAction" name="printdoc" METHOD="post" target="_blank">
<input type="hidden" name="Docid" value="XVeETjJ6Y7lvTgK+MgDgZU0jgWzcmOux4pThkFH0oPQ=">
</FORM>

<!-- Begin FORM -->
<FORM ACTION="XMServlet" name="mainform" METHOD="post">
```

```html
<input type="Hidden" name="BackType" value ="1">
<input type="Hidden" name="Folder_requested_page" value="2">

<input type="Hidden" name="Folder_go_folder" value="1">
    <input type="Hidden" name="Doclist.sort_by" value="1D">

<input type="Hidden" name="BackToDocument" value="1">
<script language="JavaScript">
```
closeWaitingWindow('process');
<!--
function doXPostProcess(webaction, xpost, xpath, val)
{
   document.mainform.webaction.value=webaction;
   var fieldName = xpost + xpath;
   document.mainform[fieldName].value = val;
   document.mainform.submit();
} function doRemoveItemLevelAttachment(webaction, xpost, xpath, val, attachuri)
{
   document.mainform.webaction.value=webaction;
   var fieldName = xpost + xpath;
   document.mainform[fieldName].value = val;
   document.mainform.AttUri.value=attachuri;
   document.mainform.submit();
} function doRemoveLineItem(webaction, xpost, xpath, val, lineitem)
{
   document.mainform.webaction.value=webaction;
   var fieldName = xpost + xpath;
   document.mainform[fieldName].value = val;
   document.mainform.RemoveLineItem.value=lineitem;
   document.mainform.submit();
} function doXPostProcessWithDefault(webaction, xpost, xpath, val, def_fieldName, def_val)
{
   document.mainform.webaction.value=webaction;
   var fieldName = xpost + xpath;
   document.mainform[fieldName].value = val;
   var DTnow = new Date();
   document.mainform[def_fieldName].value = def_val + ":" + DTnow.getTime();
   document.mainform.submit();
} var isModified = false;
function setModified(xpost) {

```
    isModified=true;
    document.mainform[xpost].value = 'true';
} function addNewAttachment(webaction, attachmentURI, xpath_val) {
    document.mainform.webaction.value=webaction;
    document.mainform.doclevelatt.value = "1";
    attachmentURI_fld = eval("document.mainform." + "XMAttachmentUri");
    attachmentURI_fld.value = attachmentURI;
    fileNameXPath_fld = eval("document.mainform." + "FileNameXPath");
    fileNameXPath_fld.value = xpath_val;
} function backToDocList()
{
    if (document.mainform.BackType.value == "1")
        document.mainform.action = "XMServlet?webaction=FdrActionGetDocList";
    else if (document.mainform.BackType.value == "2")
        document.mainform.action = "XMServlet?webaction=XMSearchDoc";
    else
        document.mainform.action =
"XMServlet?webaction=FdrActionRepliedDoc";
    document.mainform.submit();
} function editNotes()
{
    if (isModified)
    {
        if (!confirm('You have not save your changes, continue? '))
            return;
    }
    document.mainform.webaction.value="RREditNotesAction";
    document.mainform.submit();
} function editAttachment()
{
    document.mainform.webaction.value="CRAttachAction";
    document.mainform.doclevelatt.value = "0";
    document.mainform.submit();
}
// -->
</script>

<table width="100%" border="0" cellspacing="0" cellpadding="1">
<tr class="Header">
```

```
<td class="HeaderText" align="left">Draft</td>

<td class="HeaderText" align="right"><a href=""
onclick="javascript:backToDocList(); return false;">Back to list of
documents</a>  </td>

</tr>
</table>
<img src="../img/spacer.gif" alt="" height="5" width="1"><br>

<input type="hidden" name="webaction" value="">
<input type="hidden" name="doclevelatt" value="0">
<input type="hidden" name="XPostDocumentID"
value="XVeETjJ6Y7lvTgK+MgDgZU0jgWzcmOux4pThkFH0oPQ=">
<input type="hidden" name="Docid"
value="XVeETjJ6Y7lvTgK+MgDgZU0jgWzcmOux4pThkFH0oPQ=">
<input type="hidden" name="XMAttachmentUri" value="">
<input type="hidden" name="AttUri" value="">
<input type="hidden" name="FileNameXPath" value="">
<input type="hidden" name="RemoveLineItem" value="">

<!-- HEADER BAR -->

<table width="100%" border="0" cellspacing="0" cellpadding="2">
 <tr class="Header">
   <td align="left" width="30%" nowrap class="HeaderText">Reply
To: Rubicon  </td>
   <td align="right" nowrap width="30%" class="ElementStyle">
      <input type="submit" name="Send" value="Send" class="ElementStyle"
onClick="document.mainform.webaction.value='CRSendAction';
javascript:openWaitingWindow('XMServlet?webaction=XMDisplayProcessing','pr
ocess');javascript:document.mainform.submit(); return false;">
      <input type="submit" name="Save" value="Save as Draft"
class="ElementStyle"
onClick="document.mainform.webaction.value='CRSaveAction';
javascript:openWaitingWindow('XMServlet?webaction=XMDisplayProcessing','pr
ocess');javascript:document.mainform.submit(); return false;">
      <input type="submit" name="Validate" value="Validate"
class="ElementStyle"
onClick="document.mainform.webaction.value='CRValidateAction';
javascript:openWaitingWindow('XMServlet?webaction=XMDisplayProcessing','pr
ocess');javascript:document.mainform.submit(); return false;">
      <input type="reset" name="Reset" value="Reset" class="ElementStyle">
   </td>
 </tr>
</table>

<table width="100%" border="0" cellspacing="0" cellpadding="2">
 <tr class="Header">
```

```
<td align="left" nowrap class="HeaderText">Quote</td>
<td align="right" nowrap class="HeaderText">
 <a href="" onclick="javascript:editNotes(); return false"
onMouseOver="status='Edit document notes'; return true;"
onMouseOut="status=''; return false;">
 <img src="../img/icon_notes.gif" width="15" height="15"
border="0"></a>   <a href="" onclick="document.printdoc.submit(); return false"
onMouseOver="status='Print document'; return true;" onMouseOut="status='';
return false;">
 <img src="../img/icon_print.gif" width="15" height="15"
border="0"></a>   <a href="" onclick="javascript:editAttachment(); return false;">Add/Edit
Attachments</a></td>
 </tr>
</table>

<img src="../img/spacer.gif" alt="" height="3" width="1"/><br/>
<table width="100%" border="0" cellspacing="0" cellpadding="0">

<tr>
<!-- MAIN document area -->
<td colspan="2">
<Frame>
<?xml version="1.0" encoding="UTF-8"?>
<TABLE xmlns:cbl="urn:x-
commerceone:document:com:commerceone:XCBL30:XCBL30.sox$1.0"
xmlns:xm="http://www.commerceone.com/xcblmailbox"
xmlns:ext="http://www.commerceone.com/xmlpres" width="100%" border="0"
cellspacing="0" cellpadding="1"><TR class="ListHeader"><TD
class="ListHeaderText" colspan="2" align="left">Quote
Header:</TD></TR><TR><TD width="50%"
class="StatusHeaderSmallNew"><span
class="RequiredField">*</span>Quote#:</TD><TD width="50%"
class="StatusHeaderSmallNew"><span class="RequiredField">*</span>Quote
IssueDate:
 (Please Input as MM/dd/yyyy)
 </TD></TR><TR><TD width="50%" class="ElementStyle"><input value=""
name="XPostChange:/Quote/QuoteHeader/QuoteID/Reference/RefNum"
type="hidden"/><input
onChange="javascript:setModified('XPostChange:/Quote/QuoteHeader/QuoteID/
Reference/RefNum');" size="20" value="PC-009"
name="XPostContent:/Quote/QuoteHeader/QuoteID/Reference/RefNum"
type="text" class="ElementStyle"/></TD><TD width="50%"
```

```
class="ElementStyle"><input value=""
name="XPostChange:/Quote/QuoteHeader/QuoteIssueDate"
type="hidden"/><input
onChange="javascript:setModified('XPostChange:/Quote/QuoteHeader/QuoteIss
ueDate');" size="15" value=""
name="XPostContent:/Quote/QuoteHeader/QuoteIssueDate" type="text"
class="ElementStyle"/></TD></TR><TR class="ListRowAlternate"><TD
class="StatusHeaderNew" width="50%" align="left">Quote Sent to Buyer:ABB-
1010</TD><TD class="StatusHeaderNew" width="50%" align="left">From
Seller:ABB-1010</TD></TR><TR><TD class="BodyText">ABB Cornerstone
Company</TD><TD class="BodyText">ABB Cornerstone
Company</TD></TR><TR><TD class="BodyText">45 Terrance Blvd.</TD><TD
class="BodyText">45 Terrance Blvd.</TD></TR><TR><TD
class="BodyText">7th Floor</TD><TD class="BodyText">7th
Floor</TD></TR><TR><TD class="BodyText">Auction Department</TD><TD
class="BodyText">Auction Department</TD></TR><TR><TD
class="BodyText">Angelville,
USCA96660</TD><TD class="BodyText">Angelville,
USCA96660</TD></TR><TR><TD class="BodyText">US</TD><TD
class="BodyText">US</TD></TR><img width="1" height="5" alt=""
src="../img/spacer.gif"/><BR/></TABLE><TABLE xmlns:cbl="urn:x-
commerceone:document:com:commerceone:XCBL30:XCBL30.sox$1.0"
xmlns:xm="http://www.commerceone.com/xcblmailbox"
xmlns:ext="http://www.commerceone.com/xmlpres" width="100%" border="0"
cellspacing="0" cellpadding="0"><a
name="QuoteDetail_LineItemLabelnew"/><TR class="ListHeader"><TD
class="ListHeaderText" align="left">Quote Detail:</TD><TD
class="ListHeaderText" align="right" colspan="4"><input value=""
name="XPostAddInto:/Quote/ListOfQuoteDetails" type="hidden"/><a
onMouseOut="status=''; return false;" onMouseOver="status='Add New Line
Item'; return true;" onClick="doXPostProcess('CRSaveAction', 'XPostAddInto:',
'/Quote/ListOfQuoteDetails', 'QuoteDetails'); return false;"
href="#QuoteDetail_LineItemLabelnew">[Add Line Item]</a></TD></TR><TR
bgcolor="#000000"><TD height="1" colspan="5"><img width="1" height="1"
alt="" src="../img/spacer.gif"/></TD></TR><TR><TD height="3"
colspan="5"><img width="1" height="3" alt=""
src="../img/spacer.gif"/></TD></TR><TR class="ListRow3"><TD
class="StatusHeaderSmallNew" align="left">Quote Item Detail 1</TD><TD
class="ListRowAlternateText" align="right" colspan="4"><input value=""
name="XPostRemove:/Quote/ListOfQuoteDetails/QuoteDetails[1]"
type="hidden"/><a onMouseOut="status=''; return false;"
onMouseOver="status='Remove Line Item'; return true;"
onClick="doRemoveLineItem('CRRemoveLineItemAction', 'XPostRemove:',
'/Quote/ListOfQuoteDetails/QuoteDetails[1]', 'true', 'LineItem1'); return false;"
href="#QuoteDetail_LineItemLabelnew">[Remove Line
Item]</a></TD></TR><TR><TD class="StatusHeaderSmallNew" colspan="5"
align="left"><span class="RequiredField">*</span>Quote
Type</TD></TR><TR><TD class="ElementStyle" colspan="5" align="left"><input
value=""
```

```
name="XPostChange:/Quote/ListOfQuoteDetails/QuoteDetails[1]/QuoteItemType
/QuoteType/QuoteTypeCoded" type="hidden"/><SELECT
onChange="javascript:setModified('XPostChange:/Quote/ListOfQuoteDetails/Quo
teDetails[1]/QuoteItemType/QuoteType/QuoteTypeCoded');" height="10"
name="XPostContent:/Quote/ListOfQuoteDetails/QuoteDetails[1]/QuoteItemType
/QuoteType/QuoteTypeCoded"><OPTION VALUE= SELECTED >
<OPTION VALUE=Accept > Accept
<OPTION VALUE=AcceptWithChanges  > Accept With Changes
<OPTION VALUE=AlternateBid  > Alternate Bid
<OPTION VALUE=BestAndFinal  > Best And Final
<OPTION VALUE=BidWithoutException  > Bid Without Exception
<OPTION VALUE=Other  > Custom Code
<OPTION VALUE=Decline  > Decline
<OPTION VALUE=DeclinedToQuote  > Declined To Quote
<OPTION VALUE=RequestForTimeExtension  > Request For Time Extension
<OPTION VALUE=UnableToQuote  > Unable To Quote
</SELECT></TD></TR><TR><TD class="StatusHeaderSmallNew"
valign="bottom" align="left"><span
class="RequiredField">*</span>Item</TD><TD class="StatusHeaderSmallNew"
valign="bottom" align="left">Part#</TD><TD class="StatusHeaderSmallNew"
width="30%" valign="bottom" align="left">Description</TD><TD
class="StatusHeaderSmallNew" valign="bottom" align="left">Qty</TD><TD
class="StatusHeaderSmallNew" valign="bottom"
align="left">U/M</TD></TR><TR><TD class="BodyText" valign="top"
align="left"><input value=""
name="XPostChange:/Quote/ListOfQuoteDetails/QuoteDetails[1]/QuoteItemDeta
il/LineItemNum/BuyerLineItemNum" type="hidden"/><input
onChange="javascript:setModified('XPostChange:/Quote/ListOfQuoteDetails/Quo
teDetails[1]/QuoteItemDetail/LineItemNum/BuyerLineItemNum');"
maxlength="11" size="5" value="1"
name="XPostContent:/Quote/ListOfQuoteDetails/QuoteDetails[1]/QuoteItemDeta
il/LineItemNum/BuyerLineItemNum" type="text"/></TD><TD class="BodyText"
valign="top" align="left">T-77-0-0-56</TD><TD class="BodyText" valign="top"
align="left" width="30%"/><TD class="BodyText" valign="top"
align="left">6000000.00</TD><TD class="BodyText" valign="top"
align="left">EA</TD></TR><TR class="ListRowAlternate"><TD
class="StatusHeaderSmallNew" colspan="5" align="left">To Be Completed by
Offeror:</TD></TR><TR class="ListRowAlternate"><TD colspan="5"><TABLE
border="0" cellpadding="0" cellspacing="1" width="100%"><TR><TD
class="StatusHeaderSmallNew" valign="bottom" align="left"><span
class="RequiredField">*</span>Unit Price:</TD><TD
class="StatusHeaderSmallNew" valign="bottom" align="left"><span
class="RequiredField">*</span>U/M:</TD><TD class="StatusHeaderSmallNew"
valign="bottom" align="left"><span class="RequiredField">*</span>Total
Price:</TD></TR><TR><TD valign="top" align="left"><input value=""
name="XPostChange:/Quote/ListOfQuoteDetails/QuoteDetails[1]/QuotePricingD
etail/PricingDetail/ListOfPrice/Price[1]/UnitPrice/UnitPriceValue"
type="hidden"/><input
onChange="javascript:setModified('XPostChange:/Quote/ListOfQuoteDetails/Quo
``` teDetails[1]/QuotePricingDetail/PricingDetail/ListOfPrice/Price[1]/UnitPrice/UnitPriceValue');" maxlength="28" size="15" value=""
name="XPostContent:/Quote/ListOfQuoteDetails/QuoteDetails[1]/QuotePricingDetail/PricingDetail/ListOfPrice/Price[1]/UnitPrice/UnitPriceValue" type="text"
class="ElementStyle"/></TD><TD valign="top" align="left"><input value=""
name="XPostChange:/Quote/ListOfQuoteDetails/QuoteDetails[1]/QuotePricingDetail/PricingDetail/ListOfPrice/Price[1]/UnitPrice/UnitOfMeasurement/UOMCoded" type="hidden"/><SELECT
onChange="javascript:setModified('XPostChange:/Quote/ListOfQuoteDetails/QuoteDetails[1]/QuotePricingDetail/PricingDetail/ListOfPrice/Price[1]/UnitPrice/UnitOfMeasurement/UOMCoded');" height="10"
name="XPostContent:/Quote/ListOfQuoteDetails/QuoteDetails[1]/QuotePricingDetail/PricingDetail/ListOfPrice/Price[1]/UnitPrice/UnitOfMeasurement/UOMCoded
"><OPTION VALUE=  SELECTED  >
<OPTION VALUE=FC  > 1000 Cubic Feet
<OPTION VALUE=MQ  > 1000 Meters
<OPTION VALUE=KS  > 1000 Pounds Per Square Inch
<OPTION VALUE=BP  > 100 Board Feet
<OPTION VALUE=KK  > 100 Kilograms
<OPTION VALUE=YL  > 100 Lineal Yards

***

<OPTION VALUE=B22  > Kiloampere
<OPTION VALUE=TAH  > Kiloampere Hour Or Thousand Ampere Hour
<OPTION VALUE=B24  > Kiloampere Per Metre
<OPTION VALUE=B23  > Kiloampere Per Square Metre
<OPTION VALUE=KBA  > Kilobar
<OPTION VALUE=2Q  > Kilobecquerel
<OPTION VALUE=B25  > Kilobecquerel Per Kilogram
<OPTION VALUE=2P  > Kilobyte
<OPTION VALUE=KB  > Kilocharacter
<OPTION VALUE=B26  > Kilocoulomb
<OPTION VALUE=B27  > Kilocoulomb Per Cubic Metre
<OPTION VALUE=B28  > Kilocoulomb Per Square Metre
<OPTION VALUE=2R  > Kilocurie
<OPTION VALUE=B29  > Kiloelectronvolt
<OPTION VALUE=78  > Kilogauss
<OPTION VALUE=KGM  > Kilogram

***

<OPTION VALUE=WG  > Wine Gallon
<OPTION VALUE=WM  > Working Month
<OPTION VALUE=WR  > Wrap
<OPTION VALUE=YRD  > Yard
<OPTION VALUE=ANN  > Years
</SELECT></TD><TD valign="top" align="left"><input value=""
name="XPostChange:/Quote/ListOfQuoteDetails/QuoteDetails[1]/QuotePricingD

```
etail/PricingDetail/TotalValue/MonetaryValue/MonetaryAmount"
type="hidden"/><input
onChange="javascript:setModified('XPostChange:/Quote/ListOfQuoteDetails/Quo
teDetails[1]/QuotePricingDetail/PricingDetail/TotalValue/MonetaryValue/Monetar
yAmount');" maxlength="28" size="15" value=""
name="XPostContent:/Quote/ListOfQuoteDetails/QuoteDetails[1]/QuotePricingD
etail/PricingDetail/TotalValue/MonetaryValue/MonetaryAmount" type="text"
class="ElementStyle"/></TD></TR></TABLE></TD></TR><TR
class="ListRowAlternate"><TD class="StatusHeaderSmallNew"
align="left">Attachment:</TD><TD colspan="4" class="ListRowAlternateText"
align="right"><input value=""
name="XPostDefaultValue:/Quote/ListOfQuoteDetails/QuoteDetails[1]/QuoteItem
ListOfAttachment/ListOfAttachment/Attachment[1]/AttachmentLocation"
type="hidden"/><input value=""
name="XPostAddInto:/Quote/ListOfQuoteDetails/QuoteDetails[1]"
type="hidden"/><input
onClick="javascript:doXPostProcessWithDefault('CRSaveAction',
'XPostAddInto:', '/Quote/ListOfQuoteDetails/QuoteDetails[1]',
'QuoteItemListOfAttachment',
'XPostDefaultValue:/Quote/ListOfQuoteDetails/QuoteDetails[1]/QuoteItemListOfA
ttachment/ListOfAttachment/Attachment[1]/AttachmentLocation',
'urn:attachment1_1'); return false;" class="ElementStyle1"
name="AddAttachment" value="Add Attachment"
type="submit"/></TD></TR><TR class="ListRowAlternate"><TD height="8"
colspan="5"><img width="1" height="8" alt=""
src="../img/spacer.gif"/></TD></TR><TR bgcolor="#000000"><TD height="1"
colspan="5"><img width="1" height="1" alt=""
src="../img/spacer.gif"/></TD></TR></TABLE><img xmlns:cbl="urn:x-
commerceone:document:com:commerceone:XCBL30:XCBL30.sox$1.0"
xmlns:xm="http://www.commerceone.com/xcblmailbox"
xmlns:ext="http://www.commerceone.com/xmlpres" width="1" height="20" alt=""
src="../img/spacer.gif"/><BR xmlns:cbl="urn:x-
commerceone:document:com:commerceone:XCBL30:XCBL30.sox$1.0"
xmlns:xm="http://www.commerceone.com/xcblmailbox"
xmlns:ext="http://www.commerceone.com/xmlpres"/><TABLE xmlns:cbl="urn:x-
commerceone:document:com:commerceone:XCBL30:XCBL30.sox$1.0"
xmlns:xm="http://www.commerceone.com/xcblmailbox"
xmlns:ext="http://www.commerceone.com/xmlpres" width="100%" border="0"
cellspacing="0" cellpadding="0"><TR class="ListHeader"><TD
class="StatusHeaderNew1" align="left">Quote Summary:</TD></TR></TABLE>
</Frame>

</td>
</tr>
</table>

<!-- END MAIN document area -->

</FORM>
```

```
<!-- END FORM -->

<!-- END MAIN content cell -->

</TD></TR></TBODY>
  </TABLE>
</BODY>
</HTML>
<!------------------------- end Mailbox20.jsp ------------------------ -->
```

FIG. 13 is a sample user interface screen. This screen corresponds to the HTML code above. Alternative embodiments may use a display language other than HTML or may use smart terminals or thin clients instead of being specifically adapted to browsers. In FIG. 13, a number of user controls are provided. A send control 1301 allows a user to send a completed document. Preferably, the document is validated prior to the send control being functional. A save as draft control 1302 allows the user to save the document without sending it or validating it. A validate control 1303 allows the user to invoke one or more levels of validation. Data entry validation may be supported for editable fields without invoking this validate control. For instance, numeric data may be required in the unit price field 1328 and the total price field 1331, even without invoking the validate control 1303. Controls for adding and removing line items 1304 are appropriate to a quote, request for quote or similar electronic commerce document. These controls may either invoke a procedure running within a browser, such as a JavaScript procedure, or may cause a client to contact a server for an updated screen. An add attachment control 1305 allows the user to add an attachment, which then is listed under attachments 1332. In this example, the fields of a quote can be grouped. The status of this example is draft 1311. A reply to designee is identified 1312. The document type is a quote 1313. The quote header 1314 in this example includes a sequence number, which may be automatically generated by either the client or server, and a date field which may be automatically populated or manually entered. The issuer and recipient data 1315 is generated by a transformation of a request for quotation. The quote detail 1321 includes several fields of various types. A status field populated from a pull down menu as provided 1322. An item number 1323 is given a starting value, which may be editable. Additional fields 1324-1327 copy into the quotation information from the request for quotation. The user completes the unit price 1328. A unit of measure is selected from a pull down menu 1329. This field could be given a starting value to match the request for quotation. A total price field 1331 can be completed by the user or automatically calculated as an extension of the quantity and unit price. A quote summary field 1333 can be generated automatically or filled in by a user. Not visible in the sample screen, but included in the HTML code above are path specifications corresponding to fields of data that appear on the screen. Path specifications may be provided for all fields or only for editable fields. Also not visible are update status fields. The HTML code above provides a hidden update status field for at least the editable fields. This optional update status field can be used by either the client or the server to process and update more efficiently. The client can use an update status field to limit the information communicated to the server, in some embodiments. The server can use the update status field to avoid changing values already resident in memory, in some embodiments.

Figure 14:
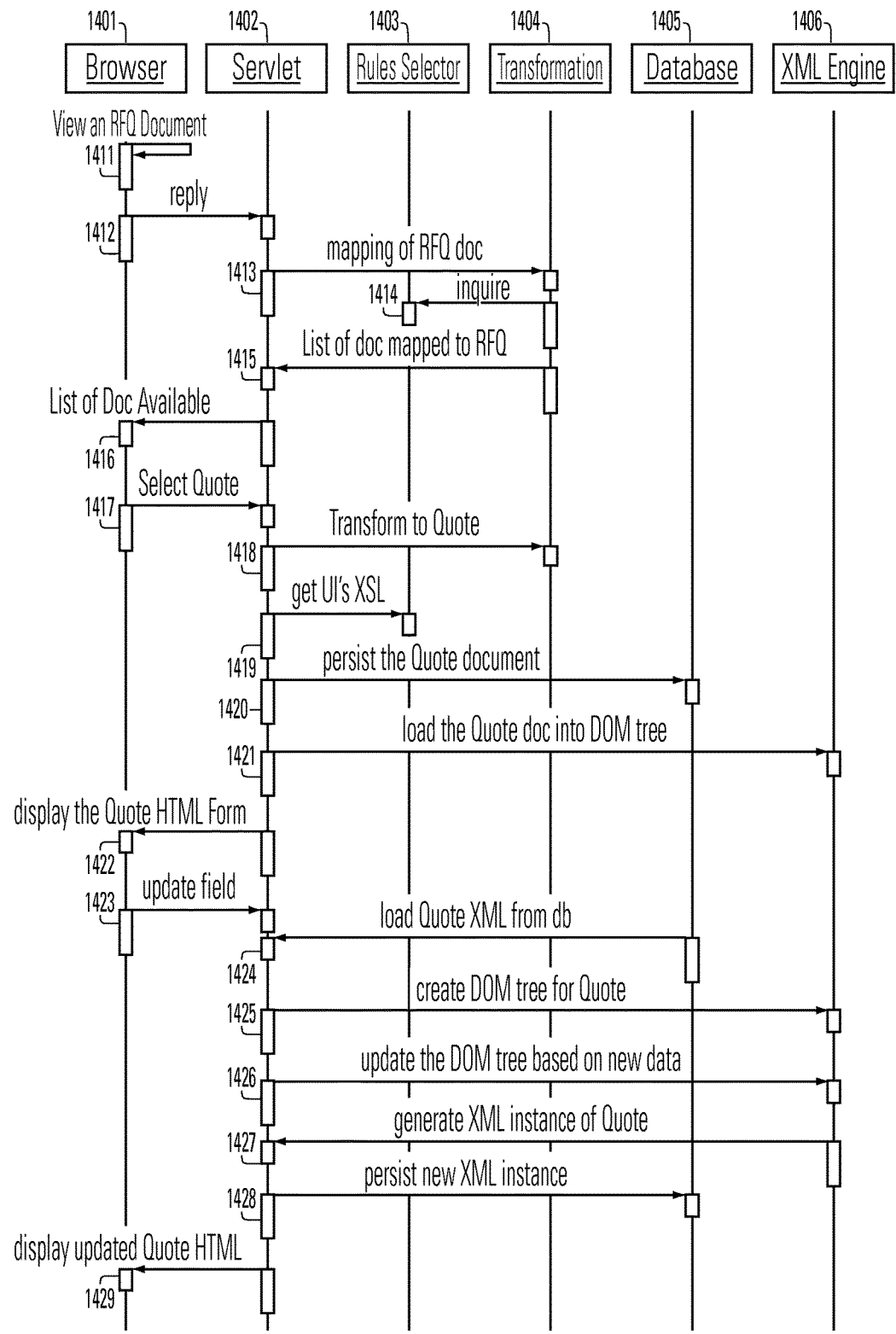
FIG. 14 is an action sequence for replying to a document.

FIG. 14 is a sequence diagram for communications among components such as those depicted in the alternative embodiments of FIGS. 6, 7 and 11. The browser 1401 is the component with which the user interacts. It may be a web browser, a thin client, a smart terminal or other equivalent hardware and software interface. The servlet 1402 runs on the server. The rule selector 1403 is a component for choosing the appropriate rules, forms etc. The transformation component applies a declarative transformation to a self-describing, structure document. For instance, an XSL style sheet can be applied to an XML document to generate a new XML document. Or, a JSP page or XSLT style sheet can be applied to an XML document to generate an HTML page for display. A variety of declarative transformations can be used. A database 1405 manages persistent storage. An XML engine 1406 manipulates an XML document in memory.

The sequence in FIG. 14 begins at the browser 1401, with a user viewing a request for quotation document 1411. The user requests generation of a reply document 1412. The servlet initiates mapping the document to a set of potential replies 1413. The servlet may receive from the browser a starting document type or it may receive a document ID for a self-describing, structured document and learn the document type from accessing the document. From a starting document type, the rule selector is invoked 1414 to determine the available reply types. The transformation engine generates an interface screen 1415, which the servlet returns to the browser 1416. The user selects a reply type, for instance a quote 1417. The servlet transforms the starting document, in this example a request for quotation, into a draft resulting document 1418, in this case a quote. In no particular order, a style sheet is retrieved 1419 and applied to the quote to generate a user interface screen (implied), the quote is persisted by the database 1421 and, in some embodiments, the quote is loaded into an internal data structure for ease of manipulation 1421. This data structure may be a DOM tree. Once data for the user interface has been generated, it can be transmitted by the servlet to the browser 1422. The user updates fields and sends all or part of the data received from the servlet back 1423. The servlet may either have the draft quote in memory, it may retrieve the draft quote from the database 1424 and create a data structure in memory 1425 to be updated 1426, or it may create a quote from the data received back from the browser. In the embodiment illustrated here, the draft quote is retrieved from a database and updated 1426 with the fields that have been flagged as modified by the user. The updated data structure in memory is used to generate a self-describing, structured document 1427, which is persisted to the database 1428. Once updating has been accomplished, the update is communicated to the browser 1429. Not shown in this sequence are the validation steps previously discussed.

Figure 15:
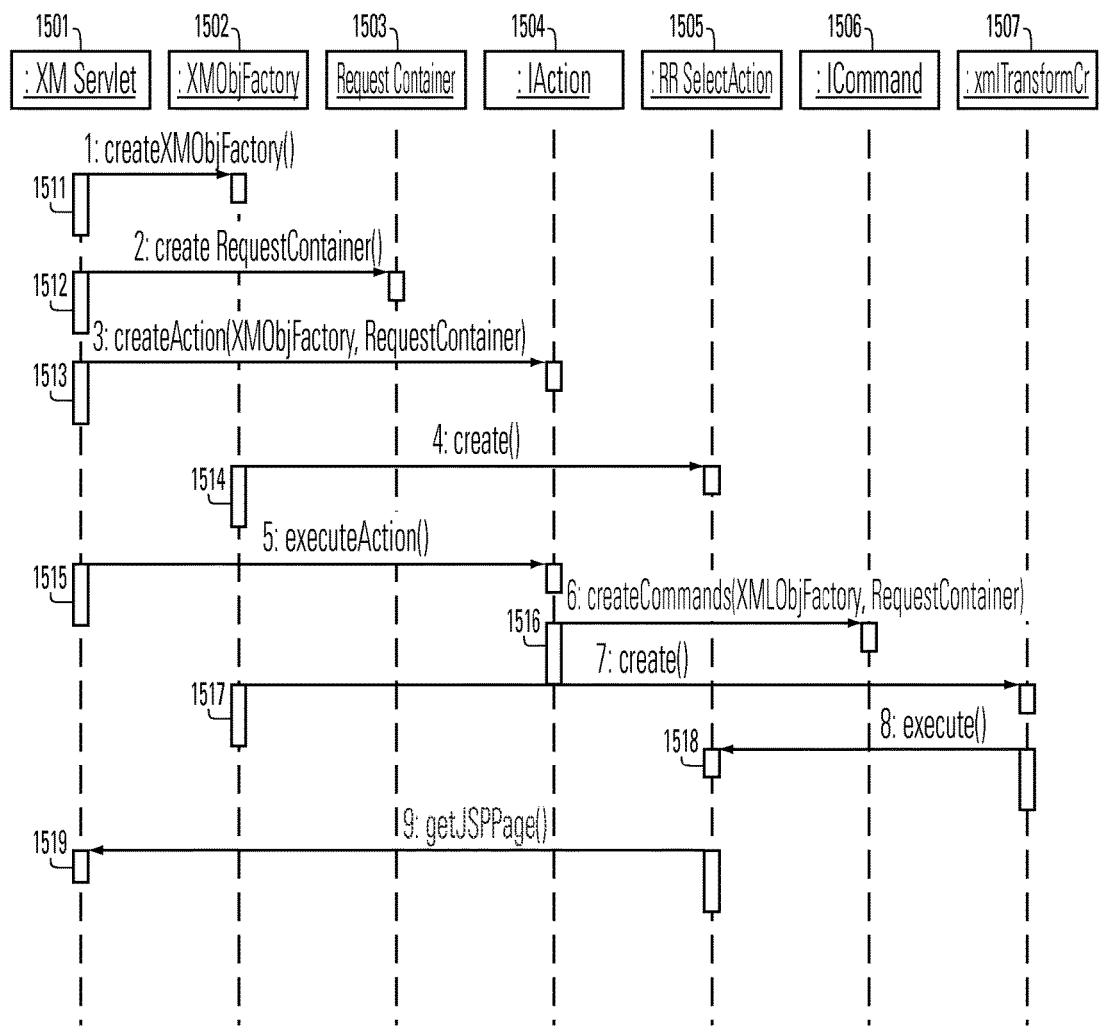
FIG. 15 is a sequence diagram illustrating use of a servlet to control responses to a user action request.

FIG. 15 depicts an action command framework. In this framework, the servlet translates actions into one or more commands. This facilitates modification of process flow and reuse of sub process steps. A number of software components 1501-1507 are used to implement this framework. The sequence diagram depicts initialization of the object factory 1511. A request container is created 1512. The requested action from a user is created using the initialized object factory and request container 1513. The object factory acts to create the requested action 1514, consistent with appropriate selection of parameters, forms, etc. The servlet directs execution of the action 1515. A set of commands are created to carry out the action 1516. The object factory creates the appropriate commands 1517. The commands are executed 1518, and an appropriate JSP page accessed 1519.

Figure 16:
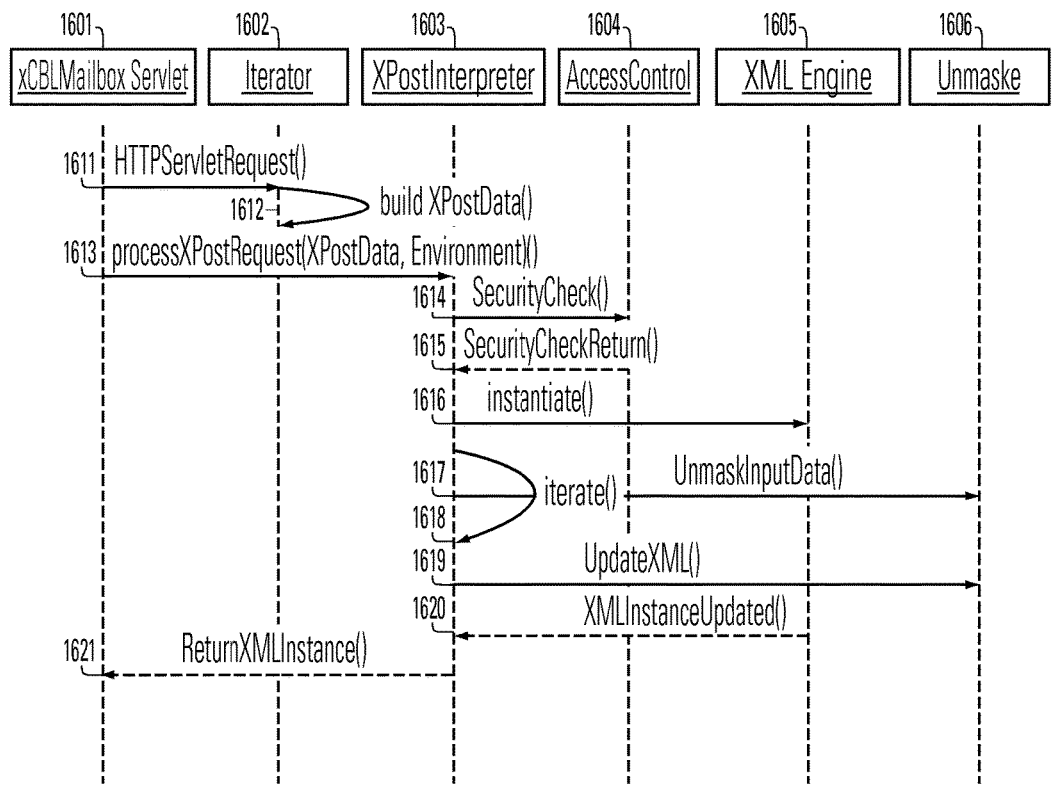
FIG. 16 is a sequence diagram illustrating interaction between a servlet, interpreter and data structure engine, in response to data from a user.
Figure 17:
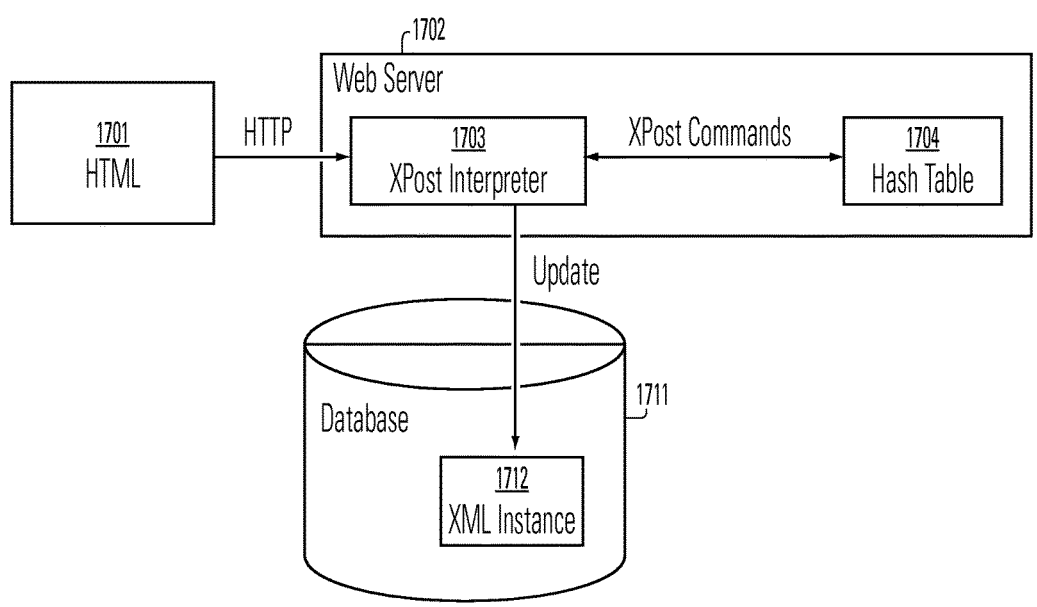
FIG. 17 is a block diagram illustrating posting of data and some of the components involved in responding.

FIG. 16 depicts interaction among the servlet, the XPost interpreter and the XML engine when receiving a request from the client. A set of software components 1601-1616 are provided. Prior to the sequence illustrated in this figure, the servlet 1601 receives data including sets of update operators, path specifications and update values. In one embodiment, the servlet receives this data from a client browser via an HTTP post command in an HTML format. The servlet passes the data 1611 to an iterator 1602. The iterator builds a dictionary, table or other data structure in a form that the interpreter expects 1612. The servlet 1601 invokes 1613 interpreter 1603 to process the data structure. The interpreter exchanges messages 1614, 1615 with access control to determine the security status of the requestor. Assuming that the security check passes, the interpreter instantiates 1616 the resources needed to process the data. Fields received from the user are unmasked 1617 from a user-friendly format to a canonical format used for internal processing. This unmasking is repeated as often as required 1618. With data in a canonical format, the XML engine 1605 is invoked 1619 to update a document consistent with the data structure. The updated document is returned 1620, 1621. Some of the components involved in the sequence are depicted in the block diagram of FIG. 17. Updated HTML 1701 is posted via HTTP to the Web server 1702. The XPost interpreter 1703 acts upon XPost commands which may be stored in a hash table, dictionary or other data structure 1704. The XPost interpreter 1703 controls updating of an XML instance 1712 in a database 1711, which manages persistent storage.

Figure 18:
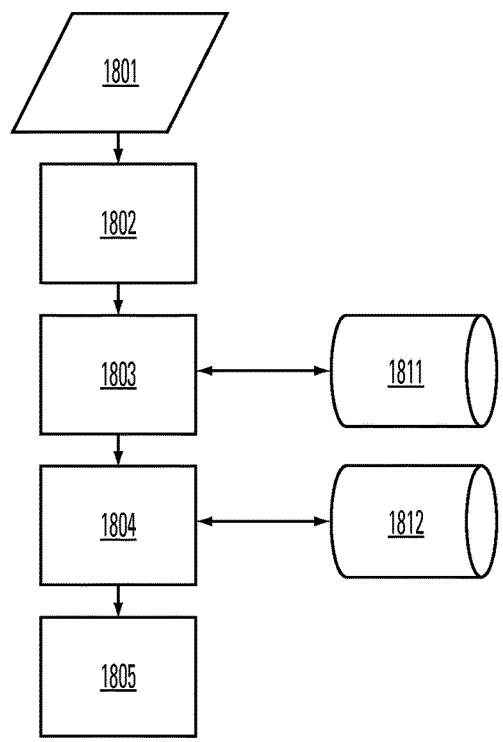
FIG. 18 is a simplified flow chart for a method of updating a self-describing, structured document.

FIG. 18 is a simplified flow chart for a method of updating a self-describing, structured document. The character string 1801 is received. The character string may be encoded according to any of a variety of standards, such as UTF-8. The character string includes an update operator or other indication of the desired operation, a path specification identifying a node or location within a self-describing, structured document, at which the update operator is to be applied, and one or more update values. One update operator may apply to a plurality of path specifications and update values. Alternatively, the update operator may be received as part of the URL that invokes processing or it may be implied by the manner in which the update component is invoked. Update operators may include deleting an element, adding an element before an identified node as a sibling of the node, adding an element after the identified node is a sibling of the node, adding the element as a child of the identified node, or a combination of delete and add to accomplish a move or a replace. Other update operators can be supported. The past specification may be compliant with XPath or a subset of XPath. It is preferred to fully specify the path in absolute, instead of relative terms. Reference to identifying a node in the self-describing, structured document is not meant to imply that the document needs to be manipulated using the document object model or any other tree structured tool. The document can readily be manipulated with SAX-compliant tools or other event-driven tools. The character string is parsed 1802. A self-describing, structured document is accessed 1803. The document has a document type, which may be received or may be obtained from the document itself. The document may be accessed from disk 1811 or may already be resident in memory when the character string is received. XML documents are among those that can be considered self-describing, structured documents. A schema corresponding to the document type of the document is accessed 1804. The schema may be accessed from a database 1812, disk or memory. The schema is used for validating 1804 application of the update operator and update values at the node identified in the past specification. The schema may be SOX-compliant, XML schema-compliant, or RELAX-compliant. Other schemas may apply to XML or non-XML documents. Following successful validation, the document is updated 1805 with update values at the node specified in the past specification. In some embodiments, the character string will include a document or a binary document ID will be sent in addition to a character string. In other implementations, the document ID will be implied by prior state information, in which case the document may already be in memory. All or part of the document may be accessed via a data-object-model data structure in memory. Any of the embodiments may be used with the past specification that is compliant with any version of an XPath standard. Similarly, any of the embodiments may be used with a schema that is compliant with any version of a Sox standard. In some embodiments, an element set will be constructed, such as a set of fields for a line item in a purchase order. A set of elements associated with a single location or node may be assigned a shorthand or alias and accessed or specified using the shorthand or alias. When an alias is used for a set of elements, more than one update value may be associated with a single path specification. In addition to validation against the schema, this process may further involve validation against a business processing rule set. The business processing rules may be selected according to the document type, trading partner, or other criteria. The business processing rules may be implemented by a set of Schematron declarations or may be implemented in procedural logic.

Figure 19:
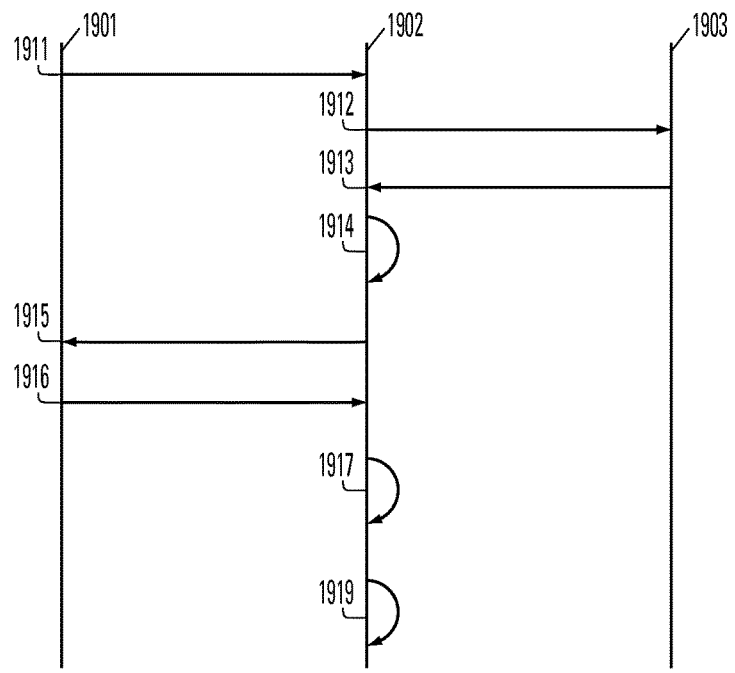
FIG. 19 illustrates a protocol for updating a self-describing, structured document corresponding to one of a plurality of document schemas.

FIG. 19 illustrates a protocol for updating a self-describing, structured document corresponding to one of a plurality of document schemas. The entities represented in this diagram are a requestor 1901, a respondent 1902 and a source of declarative transformations 1903. The protocol begins with receiving of request 1911 identifying a starting document and specifying a document type to be generated from the starting document. The identification of the starting document and the specification of the document type may be received in two separate messages, so that the starting document is known from prior state information when the type of document is specified. The respondent, which may be a servlet running on a server, accesses one or more declarative transformations 1912, 1913 corresponding to the starting document and the specified document type. A rule selector may determine which declarative transformations are accessed. The system applies the declarative transformations to the starting document 1914, producing a plurality of path specifications for fields corresponding to the specified document type, starting values based on the starting document for at least some of the fields in some applications, fields to be completed by the user. The application of declarative transformations may produce a draft resulting document, a form, or both. In one embodiment, the system sends a form responsive to the request 1915 to the user, receives an updated form 1916, validates the update information 1917 and generates a final resulting document 1919. Validating the update information may involve one or more types of validation, such as validation against the schema and validation against business processing rules.

Figure 20:
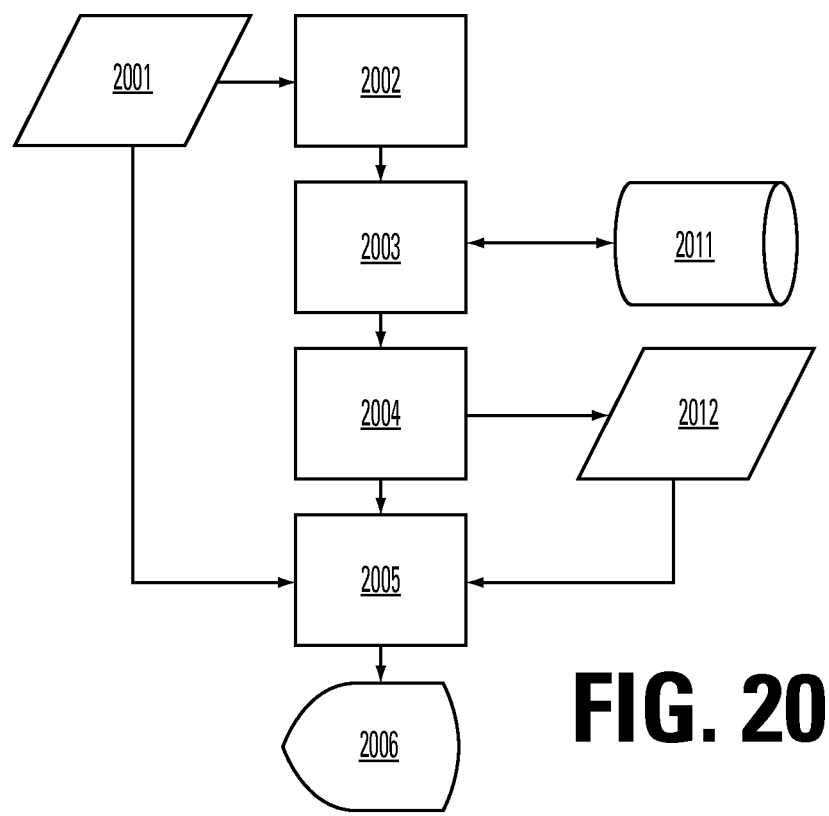
FIG. 20 is a flowchart overview of validation.

FIG. 20 is a flowchart overview of validation. A document 2001 is received 2002. Optionally, a set of declarative rules 2011 for validation is accessed 2003. The declarative rules may include schema level validation based on a Sox schema and business logic level validation using Schematron. If validation fails on the schema level, field validation errors may be displayed without proceeding to Schematron validation. Validation errors may be displayed adjacent to the node at which the error was detected. If validation fails on the Schematron level, error messages may be displayed at the top of the user interface or wherever appropriate, using the XSLT document ( ) function. The default.xsl sample code set forth above includes logic for processing both Schematron and field validation errors.

One or more errors in the primary document are detected 2004. A secondary self-describing, structured document 2012 including the detected errors is generated. For the detected errors, an error identifier and a path specification identifying a node within the primary document corresponding to one or more of the detected errors are generated. The primary 2001 and secondary 2012 documents are merged 2005 for display 2006. In one embodiment, the secondary document is an XML document. An enhanced version of the XSLT document ( ) function is used to allow retrieval of the secondary document containing error text. The XMLPres component, which implements the XSLT functionality, is an enhanced version of Apache Foundation's Xalan. This component takes into account various concepts such as name spaces in Sox documents and polymorphism. Extension of the document ( ) function enables the loading of an external document to be specified by the invoker.

Figure 21:
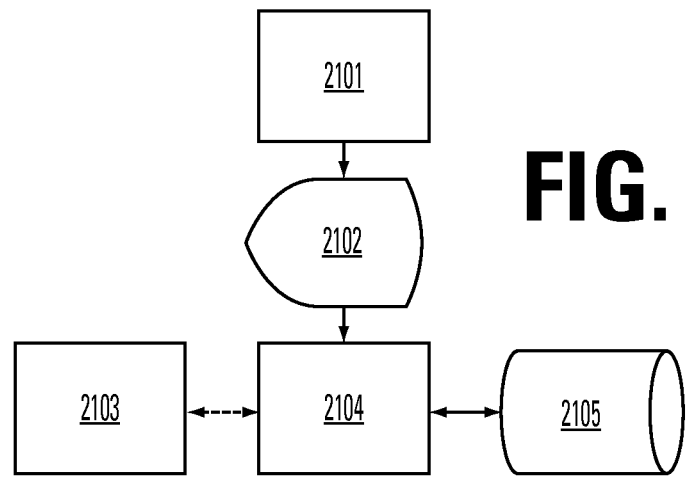
FIG. 21 is a flowchart overview of a method of searching a plurality of self-describing structure documents.

FIG. 21 is a flowchart overview of a method of searching a plurality of self-describing structure documents, the documents including document fields. A server 2101 provides a user Interface 2102. The user interface includes, in one or more screens, the document type selection filter and one or more document fields selection filters. These document field selection filters are context sensitive to the selected type of document, if a document type is selected. One or more value specification fields are supplied, to be filled in for the field selection filters. These value specification fields are context sensitive, so that field format errors, such as text characters in a numeric field, can be detected directly at the user interface, without return to the server. In addition, has non displaying fields, one or more path specifications corresponding to the document fields and the value specification fields are provided. The path specifications identifying nodes to be tested against the completed value specifications for a search. The server next receives data specifying a search 2104. This data typically comes from a user responding to the user interface. It includes the selected document type, completed value specifications and path specifications for the selected fields. Alternatively, aliases may be given for selected fields, which are expanded into path specifications by reference to a data structure 2103. A search is conducted through a subset of self-describing, structured documents 2105, based on the completed value specifications and the corresponding path specifications. The subset includes documents of the selected document type. From the perspective of the user, the user interface displays a document type selection filter, one or more document field selection filters, which are context sensitive to a selected document type and one or more value specification fields, which are context sensitive to the document fields. Not displayed to the user, except perhaps a debugging mode, are path specifications corresponding to the document fields and the value specification fields. The path specifications identify nodes to be tested against completed value specifications when a search is conducted. The user selects a document type and one or more document fields appropriate to the document type. Value specifications are completed by the user. The user's selections are transmitted to a server which may then conduct a search. Recast as a device, the computer user interface includes a document type selection filter, one or more document field selection filters coupled by context to a selected document type, one or more value specification fields, coupled by context to selected document fields, and, has non displaying fields, one or more path specifications corresponding to the document fields and to the value specification fields.

Figure 22:
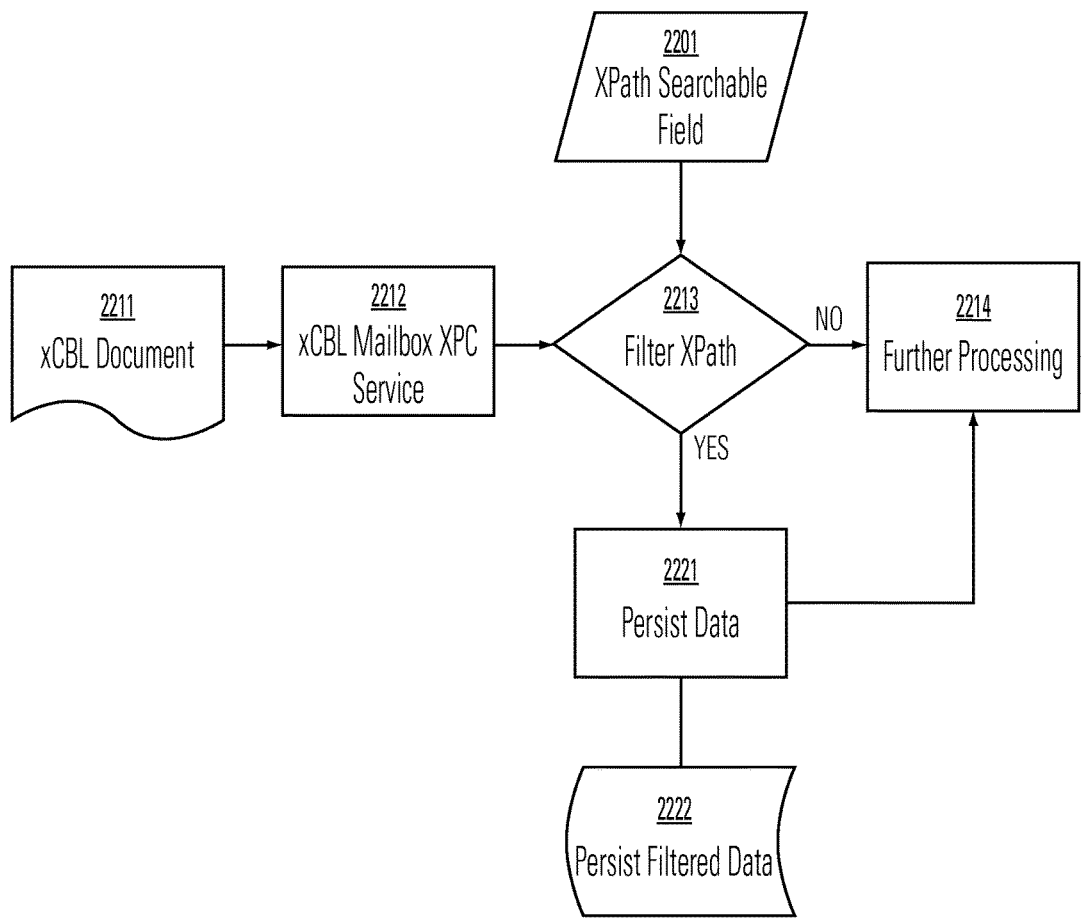
FIG. 22 a flowchart overview of preparing documents for searching.

A context-based search facility is user configurable. Database configuration interfaces may be used for specifying those fields to be indexed. The user interface can be configured to provide user-friendly names to be displayed corresponding to XPath or field element name representations. Configuring the user interface permits fields that have different names in different document types to begin a common, user-friendly name at the user interface. FIG. 22 identifies components of context-based searching. Upon receiving a new document 2211, the generic document handling service 2212 will scan its configurations 2201 to determine if 2213 the document has been configured for content-based searching. If the document type is configured to be searched, the system identifies fields to be indexed. In one embodiment, it uses the XPath specification of the incoming document fields to locate the indexable fields. After indexing, a process is invoked to persist the data 2221. Persistent indexed data is stored 2222. Further processing proceeds. Database configuration is supported by various tables.

FIG. 23 depicts a document type list used for database search configuration. A list, table or other data structure may be used to capture all document types recognized by the generic document handling system, or at least by the indexing system. The type ID column 2301 contains an integer value for an automatically generated field ID. This unique field ID is used as a shorthand for the document type. The type column 2302 is the character string identifying the document type. For instance, "request for quotation" is a document type. The name space column 2303 identifies the name space to which this document type belongs. The name space may be a uniform resource name that fully qualifies a location at which a schema for the document can be found. Column 2304 is an extra column reserved for future use. The application-created column 2305 is an integer used to flag fields in which data is entered manually. This field should be left null if data is entered manually.

Figure 24A:
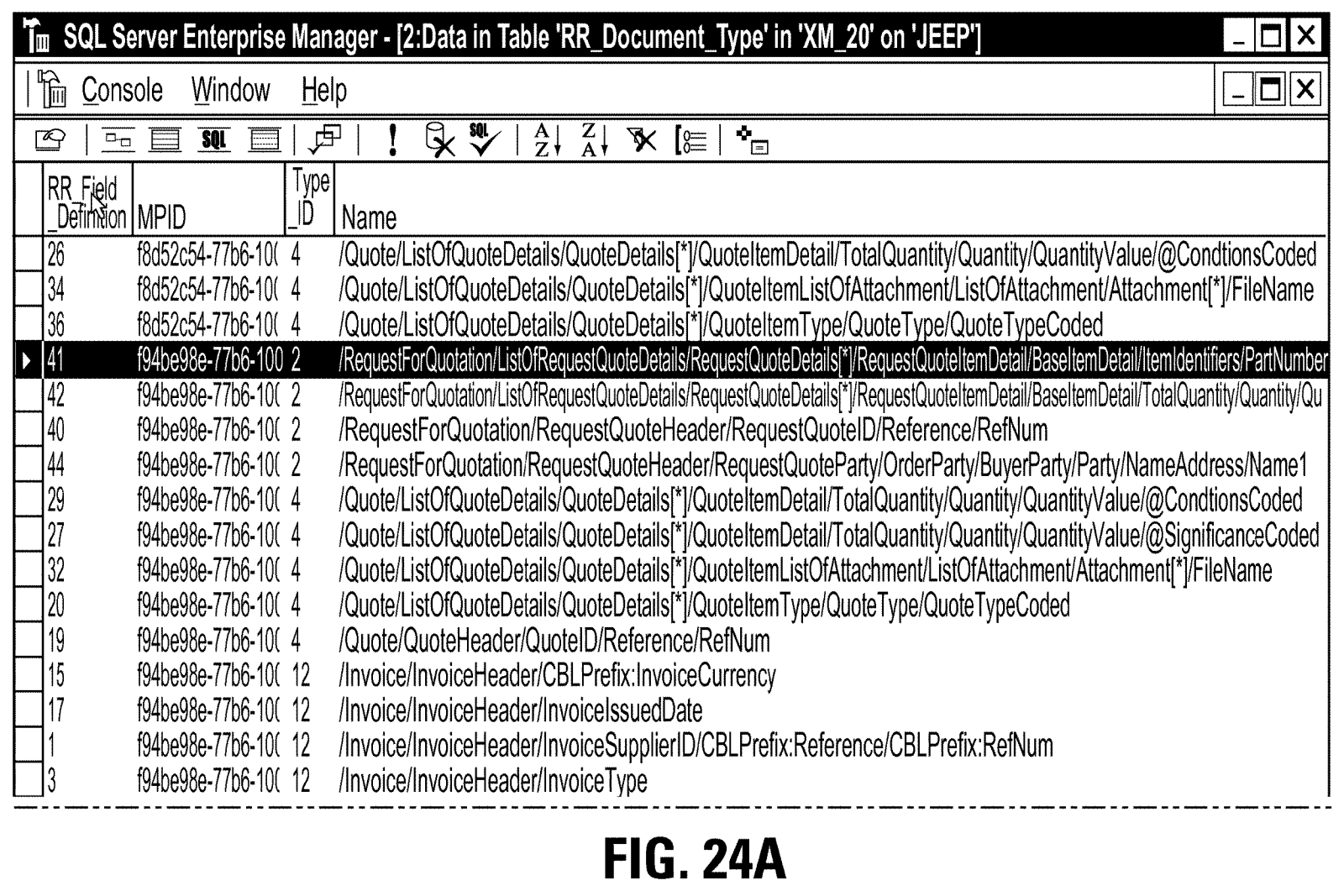
Figure 24B:
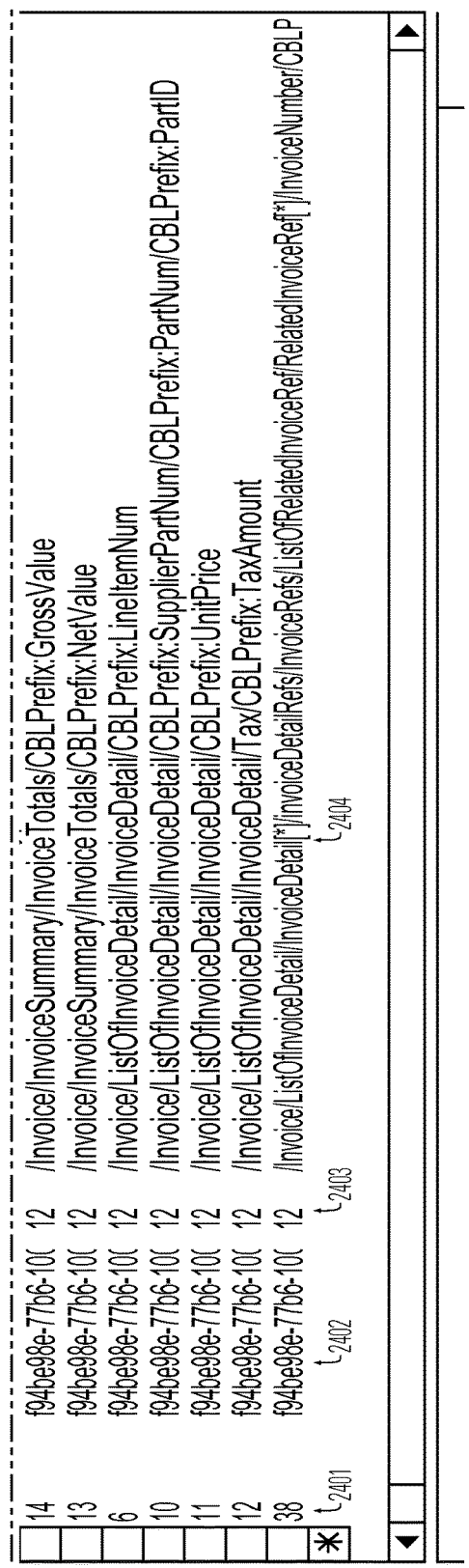

FIG. 24A-B depicts a field definition table that is populated with path specifications of elements that will be searched. The field definition column 2401 is an automatically generated integer value, that is used as a shorthand for the field. The MPID column 2402 is a unique identifier for a particular trading partner for whom the past specification that follows is valid. The type ID column 2403 is an integer value mapped to the document's type ID 2301. Many fields can be mapped to a single document type. The name field 2404 is a path specification. In some embodiments, it is an XPath for an XML document.

XPath provides a unique way to identify a field inside a XML document, but it may not be meaningful to an end user. As illustrated in FIG. 25, an alias to the XPath may be used as an alternative to embedding the full XPath string with each field used in the interface. The alias may be displayed in the user interface as a field name. The generic document handling system will associate the alias with the full XPath string when user submits a request. The segment 2501 is an example of XPath and alias, segment 2502 is another example of multiple occurrence XPath and alias, segment 2503 is another example of different name space XPath and alias.

FIG. 26A-B is a table of searchable data extracted for indexing. The searchable field column 2601 identifies the field in which the data occurs. The document sequence field 2602 corresponds to the document in which the field was found. The field definition column 2603 corresponds to the field definition IDs in FIG. 24A-B. The value column 2604 contains a searchable value. This value may be a single token or it may be the full contents of the field. A single token may, in some embodiments, include embedded blanks or other non-text characters.

While the preceding examples are cast in primarily in terms of a method, devices and systems employing this method are easily understood. An electronically readable medium, such as a DVD, CD, memory module, magnetic disk or magnetic tape containing a program capable of practicing aspects the claimed method is one such device. A computer system comprising one or more servers and/or workstations having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of preparing a response to a field-tagged document received electronically, the method including:
   receiving a field-tagged document and detecting its document type;
   applying a first style sheet to generate a draft reply document and building an in-memory representation of the draft reply document;
   applying a second style sheet to generate an interface that supports editing of the in-memory draft reply document; and
   accepting edits, updating the in-memory draft reply document, marshalling it into field-tagged format, and either persisting it for later use or sending it as a reply to the field-tagged document.

2. The method of claim 1, further including identifying the first and second style sheets using the document type and the draft reply document.

3. The method of claim 1, wherein the second style sheet uses hidden fields to identify locations of the in-memory draft reply document to which edits are applied.

4. The method of claim 1, wherein the second style sheet uses hidden fields to identify field names of the draft reply document to which edits are applied.

5. The method of claim 1, further including:
   error checking the draft reply document and generating an error report of any errors detected either as an in-memory representation of the errors detected or a field-tagged error report document; and
   applying a third style sheet to merge the draft reply document and the error report and generate an interface that juxtaposes error messages with parts of the draft reply document containing errors.

6. The method of claim 5, wherein:
   the applying of the third style sheet further includes generating an interface that supports editing of the in-memory draft reply document; and
   the method further includes accepting edits, updating the in-memory draft reply document, marshalling it into a field-tagged format, and either persisting it for later use or sending it as a reply to the field-tagged document.

7. A method of editing draft field-tagged documents, the method including:
   retrieving a draft field-tagged document and detecting its document type;
   building an in-memory representation of the draft document;
   applying a first style sheet to generate an interface that supports editing of the in-memory draft document; and
   accepting edits updating the in-memory draft document, marshalling it into field-tagged format, and persisting it for later use,
   wherein the first style sheet uses hidden fields to identify nodes of the in-memory draft document to which edits are applied.

8. The method of claim 7, further including identifying the first style sheet using the document type of the draft document.

9. The method of claim 7, further including further selecting the first style sheet from among a hierarchy of generic and customized style sheets using a rule selector keyed to the document type.

10. The method of claim 7, further comprising:
    error checking updated the draft document and generating an error report of any errors detected either as an in-memory representation of the errors detected or a field-tagged error report document; and
    applying a second style sheet to merge the updated draft document and the error report and generate an interface that juxtaposes error messages with parts of the draft document containing errors.

11. The method of claim 10, wherein:
    the applying of the second style sheet further includes generating an interface that supports editing of the in-memory draft document; and
    the method further comprises accepting edits, updating the in-memory draft document, marshalling it into a field-tagged format, and either persisting it for later use or sending it as a reply to the field-tagged document.

12. The method of claim 7, wherein the first style sheet uses hidden fields to identify field names of the draft document to which edits are applied.

13. A method of composing draft field-tagged documents, the method including:
    receiving a specification of a document type for a field-tagged document to draft;
    building an in-memory representation of the draft document;
    applying a first style sheet to generate an interface that supports editing of the in-memory draft document; and
    accepting edits updating the in-memory draft document, marshalling it into field-tagged format, and persisting it for later use,
    wherein the first style sheet uses hidden fields to identify nodes of the in-memory draft document to which edits are applied.

14. The method of claim 13, further including identifying the first style sheet using the document type of the draft document.

15. The method of claim 13, further comprising:
    error checking updated the draft document and generating an error report of any errors detected either as an in-memory representation of the errors detected or a field-tagged error report document; and
    applying a second style sheet to merge the updated draft document and the error report and generate an interface that juxtaposes error messages with parts of the draft document containing errors.

16. The method of claim 13, wherein the first style sheet uses hidden fields to identify field names of the draft document to which edits are applied.

17. A device for composing and editing generic field-tagged documents, the device including:
    a processor;
    a schema repository of schemas for field-tagged documents of various document types;
    a style sheet repository of style sheets applicable to the document types adapted to generate an interface that supports editing of an in-memory draft document;

a user interaction module that receives a request from a user to compose or edit a field-tagged document;

an document module that builds an in-memory representation of a draft document, responsive to the user interaction module and compliant with a schema from the schema repository; and a transformation module that applies a style sheet to the in-memory representation of the draft document, to generate an editing interface that supports editing of the in-memory draft document, wherein the document module is further adapted to update the in-memory draft document, marshal it into a field-tagged format, and persist it for later use.

* * * * *